(12) United States Patent
Lee et al.

(10) Patent No.: US 12,424,170 B2
(45) Date of Patent: *Sep. 23, 2025

(54) DISPLAY DEVICE

(71) Applicant: SAMSUNG DISPLAY CO., LTD., Yongin-si (KR)

(72) Inventors: Wonjun Lee, Hwaseong-si (KR); Cholho Kim, Suwon-si (KR); Mihyeon Jo, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/809,281

(22) Filed: Aug. 19, 2024

(65) Prior Publication Data
US 2024/0412693 A1    Dec. 12, 2024

Related U.S. Application Data

(63) Continuation of application No. 18/085,260, filed on Dec. 20, 2022, now Pat. No. 12,067,942.

(30) Foreign Application Priority Data

Jan. 4, 2022  (KR) ........................ 10-2022-0000876

(51) Int. Cl.
G09G 3/32       (2016.01)
G06V 40/13      (2022.01)
G09G 3/3233     (2016.01)

(52) U.S. Cl.
CPC ....... *G09G 3/3233* (2013.01); *G06V 40/1318* (2022.01); *G09G 2300/0426* (2013.01);
(Continued)

(58) Field of Classification Search
CPC ................ G06F 21/32; G06V 40/1318; G09G 2300/0426; G09G 2300/0819;
(Continued)

(56) References Cited

U.S. PATENT DOCUMENTS 9,710,689 B2   7/2017  Evans, V et al.
10,198,611 B2  2/2019  Evans, V et al.
(Continued)

FOREIGN PATENT DOCUMENTS

JP   2021-039342 A   3/2021
KR   10-2021-0027110 A   3/2021

*Primary Examiner* — Kenneth Bukowski
(74) *Attorney, Agent, or Firm* — Womble Bond Dickinson (US) LLP

(57) ABSTRACT

A display device includes a plurality of pixels, each of which includes a light emitting element and a pixel driving circuit and a plurality of sensors, each of which includes a light receiving element and a sensor driving circuit. The sensor driving circuit includes a first reset transistor, a second reset transistor, a sensing capacitor, an amplification transistor, and an output transistor. The first reset transistor includes a first electrode receiving a reset voltage, a second electrode connected to a first sensing node, and a third electrode receiving a reset control signal. The second reset transistor includes a first electrode receiving the reset voltage, a second electrode connected to a second sensing node, and a third electrode receiving the reset control signal. The sensing capacitor is positioned between the first sensing node and the second sensing node.

20 Claims, 19 Drawing Sheets

(52) U.S. Cl.
CPC ............... *G09G 2300/0819* (2013.01); *G09G 2300/0842* (2013.01); *G09G 2310/08* (2013.01); *G09G 2354/00* (2013.01)

(58) Field of Classification Search
CPC ....... G09G 2300/0842; G09G 2310/08; G09G 2354/00; G09G 3/3233
See application file for complete search history.

(56) References Cited

U.S. PATENT DOCUMENTS

| | | |
|---|---|---|
| 10,796,125 B2 | 10/2020 | Gong et al. |
| 10,908,445 B2 | 2/2021 | Liu et al. |
| 2009/0032852 A1* | 2/2009 | Song .................... H04N 25/771 257/292 |
| 2019/0043420 A1 | 2/2019 | Jung |
| 2021/0066442 A1 | 3/2021 | Watanabe et al. |
| 2021/0066669 A1 | 3/2021 | Kubota et al. |
| 2021/0158751 A1 | 5/2021 | Cha et al. |
| 2021/0249495 A1 | 8/2021 | Lee et al. |
| 2023/0152926 A1 | 5/2023 | Yoshimoto et al. |

* cited by examiner

DISPLAY DEVICE

CROSS-REFERENCE TO RELATED APPLICATIONS

This application is a continuation of U.S. patent application Ser. No. 18/085,260, filed Dec. 20, 2022, which claims priority to and the benefit of Korean Patent Application No. 10-2022-0000876, filed Jan. 4, 2022, the entire content of both of which is incorporated herein by reference.

BACKGROUND

1. Field

Aspects of some embodiments of the present disclosure described herein relate to a display device.

2. Description of Related Art

A display device generally provides various functions to provide information to a user by displaying images or to communicate organically with users, such as by detecting a user input. Display devices may include functionality to detect a user's biometric information.

Biometric information recognition schemes may include a capacitive scheme that detects a change in capacitance between electrodes, an optical scheme that detects incident light by using an optical sensor, and/or an ultrasonic scheme that detects vibration by using a piezoelectric material or the like.

The above information disclosed in this Background section is only for enhancement of understanding of the background and therefore the information discussed in this Background section does not necessarily constitute prior art.

SUMMARY

Aspects of some embodiments of the present disclosure described herein relate to a display device, and for example, to a display device capable of recognizing biometric information.

Aspects of some embodiments of the present disclosure include a display device capable of improving the sensing performance of a sensor for recognizing biometric information.

According to some embodiments, a display device includes a plurality of pixels, each of which includes a light emitting element and a pixel driving circuit connected to the light emitting element and a plurality of sensors, each of which includes a light receiving element and a sensor driving circuit connected to the light receiving element.

According to some embodiments, the sensor driving circuit includes a first reset transistor, a second reset transistor, a sensing capacitor, an amplification transistor, and an output transistor. The first reset transistor includes a first electrode receiving a reset voltage, a second electrode connected to a first sensing node, and a third electrode receiving a reset control signal. The second reset transistor includes a first electrode receiving the reset voltage, a second electrode connected to a second sensing node, and a third electrode receiving the reset control signal. The sensing capacitor is positioned between the first sensing node and the second sensing node. The amplification transistor includes a first electrode receiving a sensor driving voltage, a second electrode connected to a third sensing node, and a third electrode connected to the second sensing node. The output transistor includes a first electrode connected to the third sensing node, a second electrode connected to a readout line, and a third electrode receiving an output control signal.

According to some embodiments, a display device includes a base layer, a circuit layer on the base layer, and an element layer on the circuit layer and including a light emitting element and a light receiving element. The circuit layer includes a pixel driving circuit connected to the light emitting element and a sensor driving circuit connected to the light receiving element.

According to some embodiments, the sensor driving circuit includes a first reset transistor, a second reset transistor, a sensing capacitor, an amplification transistor, and an output transistor. The first reset transistor includes a first electrode receiving a reset voltage, a second electrode connected to a first sensing node, and a third electrode receiving a reset control signal. The second reset transistor includes a first electrode receiving the reset voltage, a second electrode connected to a second sensing node, and a third electrode receiving the reset control signal. The sensing capacitor is positioned between the first sensing node and the second sensing node. The amplification transistor includes a first electrode receiving a sensor driving voltage, a second electrode connected to a third sensing node, and a third electrode connected to the second sensing node. The output transistor includes a first electrode connected to the third sensing node, a second electrode connected to a readout line, and a third electrode receiving an output control signal.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
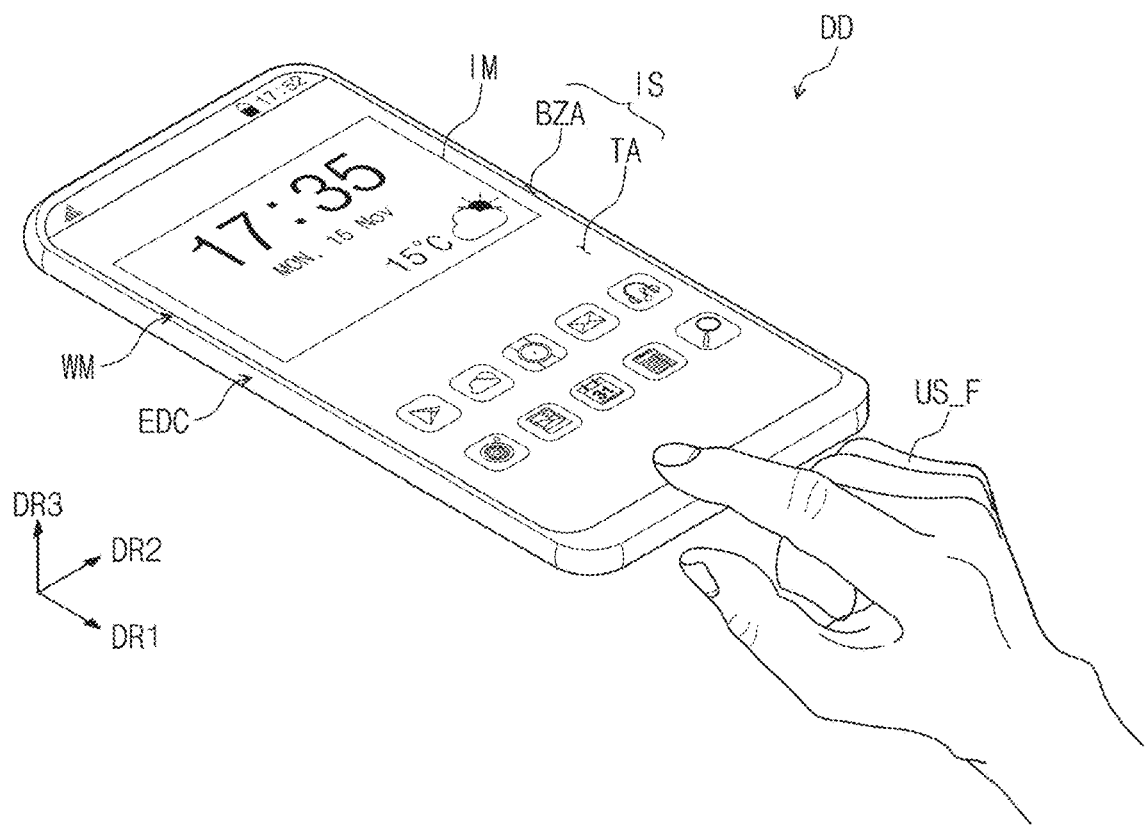
FIG. 1 is a perspective view of a display device, according to some embodiments of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 2:
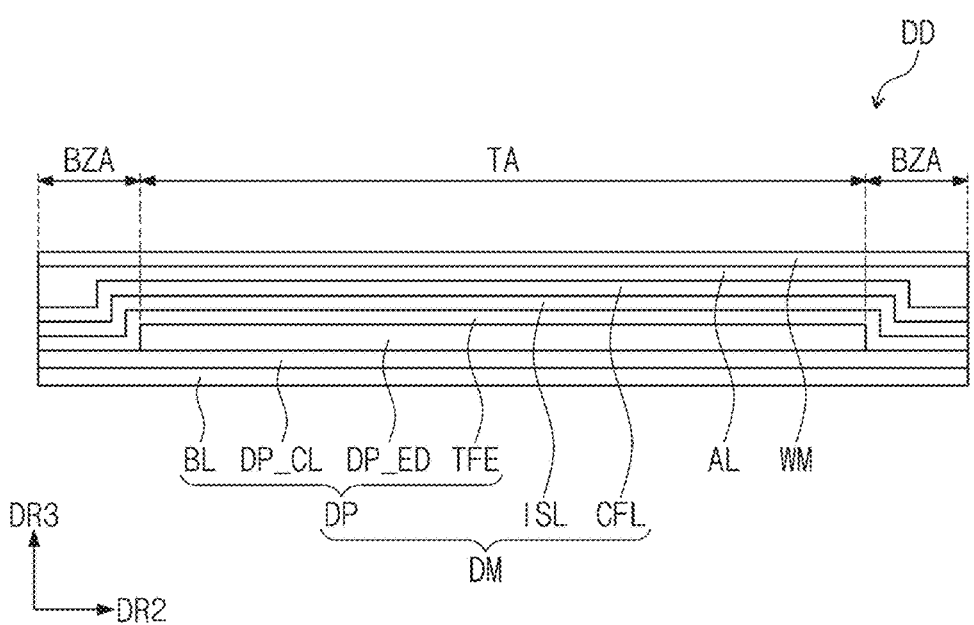
FIG. 2 is a cross-sectional view of a display device according to some embodiments of the present disclosure.

FIG. 1 is a perspective view of a display device, according to some embodiments of the present disclosure. FIG. 2 is a cross-sectional view of a display device, according to some embodiments of the present disclosure.

Referring to FIGS. 1 and 2, a display device DD may have a rectangular shape having a long side parallel to a first direction DR1 and a short side parallel to a second direction DR2 intersecting the first direction DR1. However, embodiments according to the present disclosure are not limited thereto, and the display device DD may have various shapes such as a circle and a polygon.

The display device DD may be a device activated depending on an electrical signal. The display device DD may include various embodiments. For example, the display device DD may be applied to an electronic device such as a smart watch, a tablet PC, a notebook computer, a computer, a smart television, or the like. Hereinafter, a normal direction substantially perpendicular to a plane defined by the first direction DR1 and the second direction DR2 is defined as a third direction DR3. In the specification, the meaning of "when viewed from above a plane" may mean "when viewed in the third direction DR3".

A top surface of the display device DD may be defined as a display surface IS, and may be parallel to a plane defined by the first direction DR1 and the second direction DR2. Images IM generated by the display device DD may be provided to a user through the display surface IS.

The display surface IS may be divided into a transparent area TA and a bezel area BZA. The transparent area TA may be an area in which the images IM are displayed. The user visually perceives the images IM through the transparent area TA. According to some embodiments, the transparent area TA is illustrated in the shape of a quadrangle whose corners are rounded. However, this is illustrated as an example. The transparent area TA may have various shapes, not limited to an embodiment.

The bezel area BZA is adjacent to the transparent area TA. The bezel area BZA may have a color (e.g., a set or predetermined color). The bezel area BZA may surround the transparent area TA. Accordingly, the shape of the transparent area TA may be substantially defined by the bezel area BZA. However, this is illustrated as an example. For example, the bezel area BZA may be located adjacent to only one side of the transparent area TA or may be omitted.

The display device DD may sense an external input applied from the outside. The external input may include various types of inputs that are provided from the outside of the display device DD. For example, as well as a contact by a part of a body such as the user's hand US_F or a contact by a separate device (e.g., an active pen or a digitizer), the external input may include an external input (e.g., hovering) applied when the user's hand US_F approaches the display device DD or is adjacent to the display device DD within a distance (e.g., a set or predetermined distance). In addition, the external input may have various types such as force, pressure, temperature, light, and the like.

The display device DD may detect the user's biometric information applied from the outside. A biometric information sensing area capable of detecting the user's biometric information may be provided to the display surface IS of the display device DD. The biometric information sensing area may be provided in the entire area of the transparent area TA or may be provided in a partial area of the transparent area TA. According to some embodiments of the present disclosure, FIG. 1 illustrates that the entire transparent area TA is utilized as the biometric information sensing area.

The display device DD may include a window WM, a display module DM below the window WM, and a housing EDC to house or enclose the display module DM. According to some embodiments, an appearance of the display device DD may be implemented by coupling the window WM and the housing EDC.

A front surface of the window WM defines the display surface IS of the display device DD. The window WM may include an optically transparent insulating material. For example, the window WM may include glass or plastic. The window WM may include a multi-layer structure or a single-layer structure. For example, the window WM may include a plurality of plastic films bonded to each other by an adhesive or may have a glass substrate and a plastic film bonded to each other by an adhesive.

The display module DM may include a display panel DP and an input sensing layer ISL. The display panel DP may display the images IM depending on an electrical signal. The input sensing layer ISL may sense the external input applied from the outside. The external input may be provided in various forms.

The display panel DP according to some embodiments of the present disclosure may be a light emitting display panel, but embodiments according to the present disclosure are not particularly limited thereto. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, and the like. Hereinafter, it is described that the display panel DP is the organic light emitting display panel.

Referring to FIG. 2, the display panel DP includes a base layer BL, a circuit layer DP_CL, an element layer DP_ED, and an encapsulation layer TFE. The display panel DP according to some embodiments of the present disclosure may be a flexible display panel. However, embodiments according to the present disclosure are not limited thereto. For example, the display panel DP may be a foldable display panel, which is folded with respect to a folding axis, or a rigid display panel.

The base layer BL may include a synthetic resin layer. The synthetic resin layer may be a polyimide-based resin layer, and the material thereof is not particularly limited thereto. Besides, the base layer BL may include a glass substrate, a metal substrate, an organic/inorganic composite substrate, or the like.

The circuit layer DP_CL is located on the base layer BL. The circuit layer DP_CL is interposed between the base layer BL and the element layer DP_ED. The circuit layer DP_CL includes at least one insulating layer and a circuit element. Hereinafter, the insulating layer included in the circuit layer DP_CL is referred to as an "intermediate insulating layer". The intermediate insulating layer includes at least one intermediate inorganic layer and at least one intermediate organic layer. The circuit element may include a pixel driving circuit, which is included in each of a plurality of pixels for displaying the image IM, and a sensor driving circuit, which is included in each of a plurality of sensors for recognizing external information. The external information may be biometric information. According to some embodiments of the present disclosure, the sensor may be a fingerprint recognition sensor, a proximity sensor, an iris recognition sensor, or the like. Furthermore, the sensor may be an optical sensor that recognizes the biometric information in an optical scheme. The circuit layer DP_CL may further include signal lines connected to the pixel driving circuit and/or the sensor driving circuit.

The element layer DP_ED may include a light emitting element included in each of the pixels and a light receiving element included in each of the sensors. According to some embodiments of the present disclosure, the light receiving element may be a photodiode. The light receiving element may be a sensor that detects or responds to light reflected by a user's fingerprint. Afterward, structures of the circuit layer DP_CL and the element layer DP_ED will be described in more detail with reference to FIG. 5.

The encapsulation layer TFE encapsulates the element layer DP_ED. The encapsulation layer TFE may include at least one organic layer and at least one inorganic layer. The inorganic layer may include inorganic materials and may protect the element layer DP_ED from moisture/oxygen. The inorganic layer may include a silicon nitride layer, a silicon oxynitride layer, a silicon oxide layer, a titanium oxide layer, an aluminum oxide layer, or the like, but not limited particularly thereto. The organic layer may include organic materials and may protect the element layer DP_ED from foreign objects such as dust particles.

The input sensing layer ISL may be formed on the display panel DP. The input sensing layer ISL may be located directly on the encapsulation layer TFE. According to some embodiments of the present disclosure, the input sensing layer ISL may be formed on the display panel DP through subsequent processes. In other words, when the input sensing layer ISL is directly located on the display panel DP, an adhesive film is not interposed between the input sensing layer ISL and the encapsulation layer TFE. Alternatively, the adhesive film may be interposed between the input sensing layer ISL and the display panel DP. In this case, the input sensing layer ISL is not manufactured by a process continuous to that of the display panel DP. That is, the input sensing layer ISL may be manufactured through a process separate from that of the display panel DP and may then be fixed on an upper surface of the display panel DP by the adhesive film.

The input sensing layer ISL may sense an external input (e.g., a user's touch), may change the sensed input into an input signal (e.g., a set or predetermined input signal), and may provide the input signal to the display panel DP. The input sensing layer ISL may include a plurality of sensing electrodes for sensing an external input. The sensing electrodes may sense the external input in a capacitive scheme. The display panel DP may receive an input signal from the input sensing layer ISL and may generate an image corresponding to the input signal.

The display module DM may further include a color filter layer CFL. According to some embodiments of the present disclosure, the color filter layer CFL may be located on the input sensing layer ISL. However, embodiments according to the present disclosure are not limited thereto. The color filter layer CFL may be interposed between the display panel DP and the input sensing layer ISL. The color filter layer CFL may include a plurality of color filters and a black matrix.

Details of the structure of the input sensing layer ISL and the color filter layer CFL will be described later.

The display device DD according to some embodiments of the present disclosure may further include an adhesive layer AL. The window WM may be attached to the input sensing layer ISL by the adhesive layer AL. The adhesive layer AL may include an optical clear adhesive, an optically clear adhesive resin, or a pressure sensitive adhesive (PSA).

The housing EDC is coupled to the window WM. The housing EDC is coupled to the window WM to provide an inner space (e.g., a set or predetermined inner space). The display module DM may be accommodated in the inner space. The housing EDC may include a material having relatively high rigidity. For example, the housing EDC may include glass, plastic, or metal or may include a plurality of frames and/or plates that are composed of a combination thereof. The housing EDC may stably protect configurations of the display device DD accommodated in the inner space from an external impact. According to some embodiments, a battery module for supplying power required for overall operations of the display device DD may be interposed between the display module DM and the housing EDC.

Figure 3:
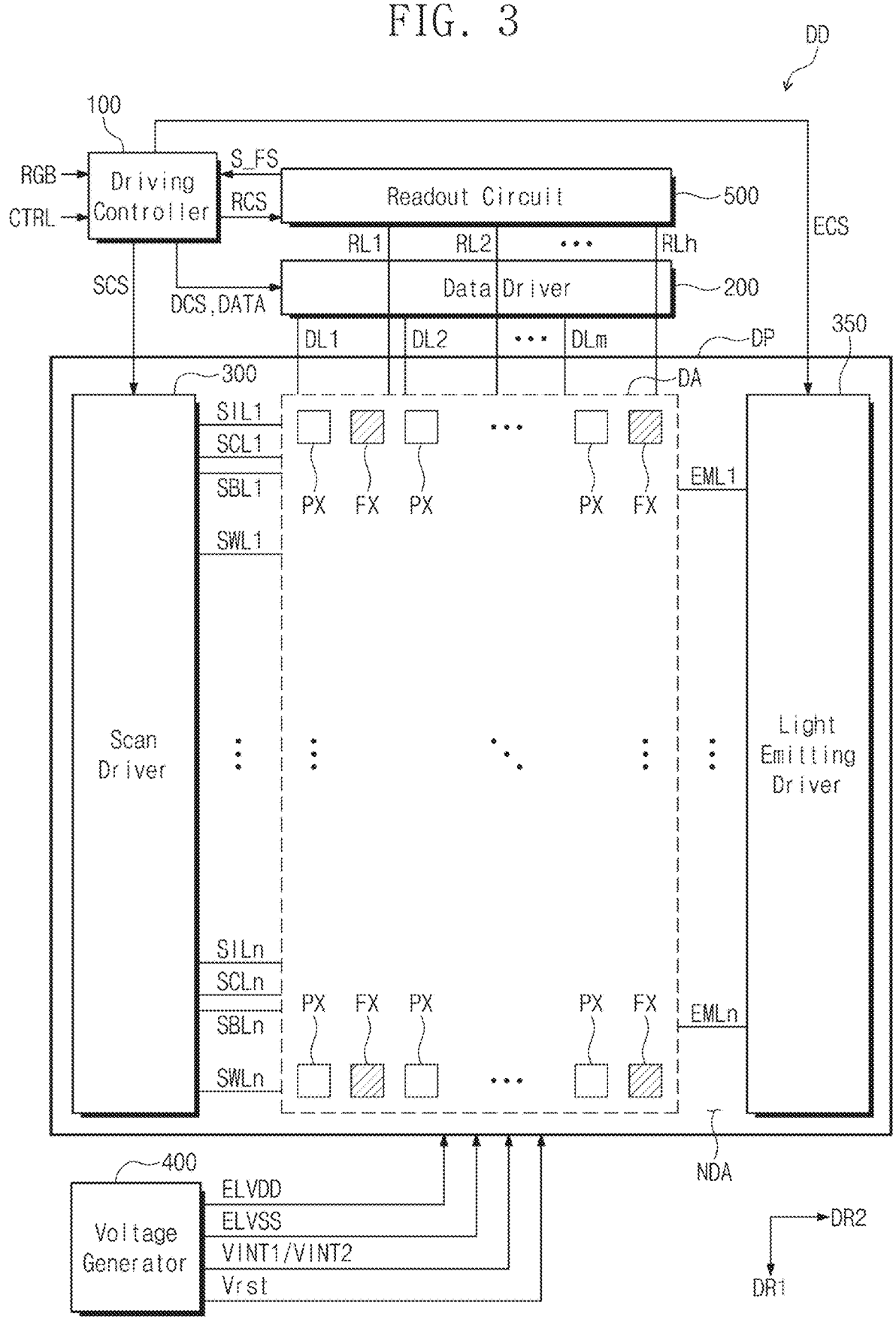
FIG. 3 is a block diagram of a display device according to some embodiments of the present disclosure.

FIG. 3 is a block diagram of a display device, according to some embodiments of the present disclosure.

Referring to FIG. 3, the display device DD includes the display panel DP, a panel driver, and a driving controller 100. According to some embodiments of the present disclosure, the panel driver may include a data driver 200, a scan driver 300, a light emitting driver 350, a voltage generator 400, and a readout circuit 500.

The driving controller 100 receives an image signal RGB and a control signal CTRL. The driving controller 100 generates an image data signal DATA by converting a data format of the image signal RGB in compliance with the specification for an interface with the data driver 200. The driving controller 100 outputs a first control signal SCS, a second control signal ECS, a third control signal DCS, and a fourth control signal RCS.

The data driver 200 receives the third control signal DCS and the image data signal DATA from the driving controller 100. The data driver 200 converts the image data signal DATA into data signals and outputs the data signals to a plurality of data lines DL1 to DLm to be described later. The data signals refer to analog voltages corresponding to a grayscale value of the image data signal DATA.

The scan driver 300 receives the first control signal SCS from the driving controller 100. The scan driver 300 may output scan signals to scan lines in response to the first control signal SCS.

The voltage generator 400 generates voltages necessary to operate the display panel DP. According to some embodiments, the voltage generator 400 generates a first driving voltage ELVDD, a second driving voltage ELVSS, a first initialization voltage VINT1, and a second initialization voltage VINT2.

The display panel DP may include a display area DA corresponding to the transparent area TA (as illustrated in FIG. 1) and a non-display area NDA corresponding to the bezel area BZA (as illustrated in FIG. 1).

The display panel DP may include the plurality of pixels PX located in the display area DA and the plurality of sensors FX located in the display area DA. According to some embodiments of the present disclosure, each of the plurality of sensors FX may be interposed between two pixels PX adjacent to each other. The plurality of pixels PX and the plurality of sensors FX may be alternately arranged on a plane defined in the first and second directions DR1 and DR2. However, embodiments according to the present disclosure are not limited thereto. That is, the two or more pixels PX may be positioned between the two sensors FX adjacent to each other in the first direction DR1 among the plurality of sensors FX. Alternatively, the two or more pixels PX may be positioned between the two sensors FX adjacent to each other in the second direction DR2 among the plurality of sensors FX.

The display panel DP further includes initialization scan lines SIL1 to SILn, compensation scan lines SCL1 to SCLn, write scan lines SWL1 to SWLn, black scan lines SBL1 to SBLn, emission control lines EML1 to EMLn, data lines DL1 to DLm, and readout lines RL1 to RLh. The initialization scan lines SIL1 to SILn, the compensation scan lines SCL1 to SCLn, the write scan lines SWL1 to SWLn, the black scan lines SBL1 to SBLn, and the emission control lines EML1 to EMLn extend in the second direction DR2. The initialization scan lines SIL1 to SILn, the compensation scan lines SCL1 to SCLn, the write scan lines SWL1 to SWLn, the black scan lines SBL1 to SBLn, and the emission control lines EML1 to EMLn are positioned spaced from one another in the first direction DR1. The data lines DL1 to DLm and the readout lines RL1 to RLh extend in the first direction DR1 and are positioned spaced from one another in the second direction DR2.

The plurality of pixels PX are electrically connected to the initialization scan lines SIL1 to SILn, the compensation scan lines SCL1 to SCLn, the write scan lines SWL1 to SWLn, the black scan lines SBL1 to SBLn, the emission control lines EML1 to EMLn, and the data lines DL1 to DLm. For example, each of the plurality of pixels PX may be electrically connected with four scan lines. However, the number of scan lines connected to each pixel PX is not limited thereto, and may be changed.

The plurality of sensors FX are electrically connected to the write scan lines SWL1 to SWLn and the readout lines RL1 to RLh. Each of the plurality of sensors FX may be electrically connected to one scan line. However, embodiments according to the present disclosure are not limited thereto. The number of scan lines connected to each of the sensors FX may be changed According to some embodiments of the present disclosure, the number of readout lines RL1 to RLh may be less than or equal to the number of data lines DL1 to DLm. For example, the number of the readout lines RL1 to RLh may correspond to $\frac{1}{2}$, $\frac{1}{4}$, or $\frac{1}{8}$ of the number of the data lines DL1 to DLm.

The scan driver 300 may be located in the non-display area NDA of the display panel DP. The scan driver 300 receives the first control signal SCS from the driving controller 100. In response to the first control signal SCS, the scan driver 300 outputs initialization scan signals to the initialization scan lines SIL1 to SILn and outputs compensation scan signals to the compensation scan lines SCL1 to SCLn. Furthermore, in response to the first control signal SCS, the scan driver 300 may output write scan signals to the write scan lines SWL1 to SWLn and may output black scan signals to the black scan lines SBL1 to SBLn. Alternatively, the scan driver 300 may include a first scan driver and a second scan driver. The first scan driver may output the initialization scan signals and the compensation scan signals. The second scan driver may output the write scan signals and the black scan signals.

The light emitting driver 350 may be located in the non-display area NDA of the display panel DP. The light emitting driver 350 receives the second control signal ECS from the driving controller 100. The light emitting driver 350 may output emission control signals to the emission control lines EML1 to EMLn in response to the second control signal ECS. Alternatively, the scan driver 300 may be connected to the emission control lines EML1 to EMLn. In this case, the light emitting driver 350 may be omitted, and the scan driver 300 may output the emission control signals to the emission control lines EML1 to EMLn.

The readout circuit 500 receives the fourth control signal RCS from the driving controller 100. The readout circuit 500 may receive readout signals from the readout lines RL1 to RLh in response to the fourth control signal RCS. The readout circuit 500 may process the readout signals received from the readout lines RL1 to RLh into detection signals S_FS and may provide the processed detection signals S_FS to the driving controller 100. The driving controller 100 may recognize biometric information based on the detection signals S_FS.

Figure 4A:
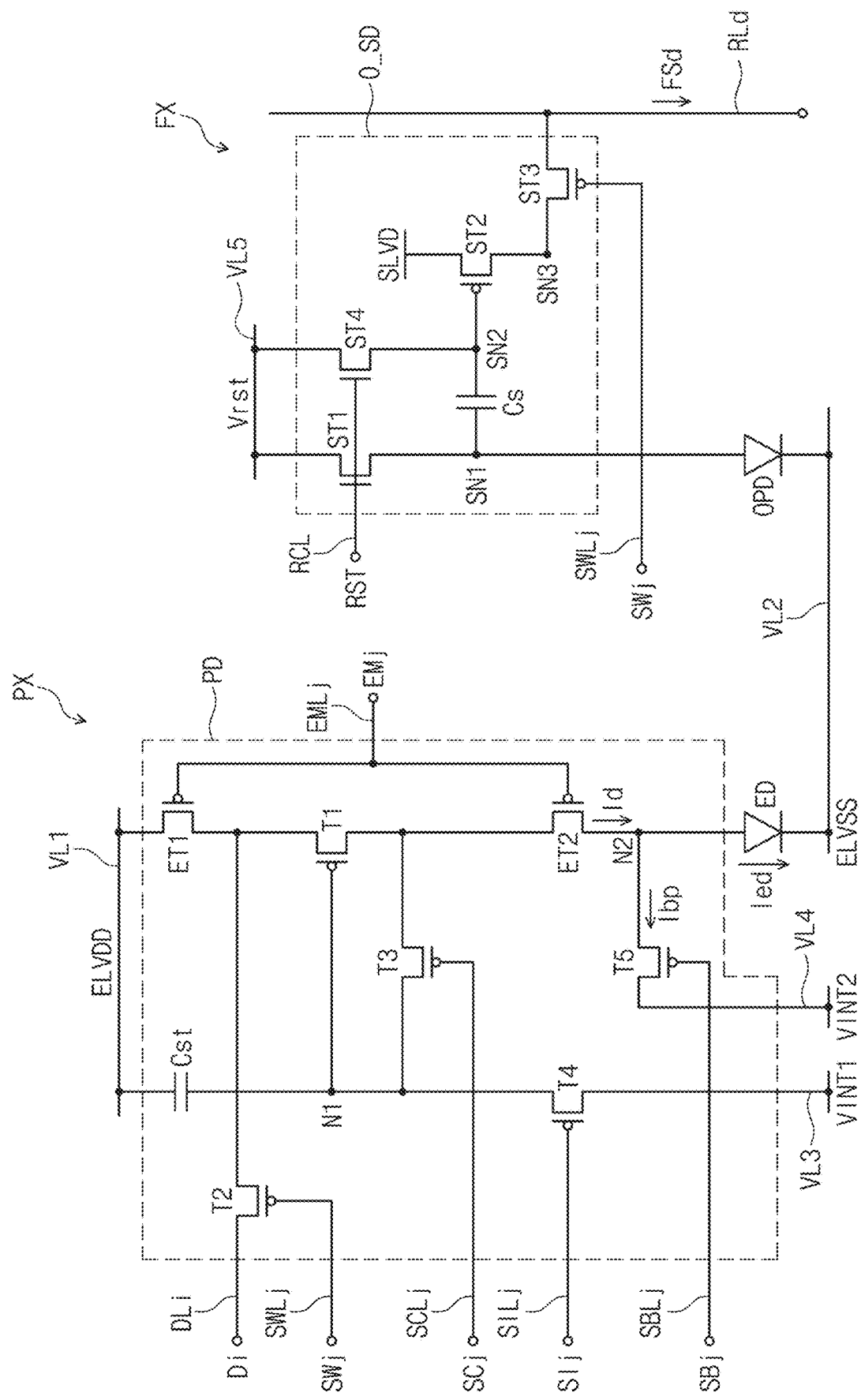
FIG. 4A is a circuit diagram illustrating a pixel and a sensor, according to some embodiments of the present disclosure.
Figure 4B:
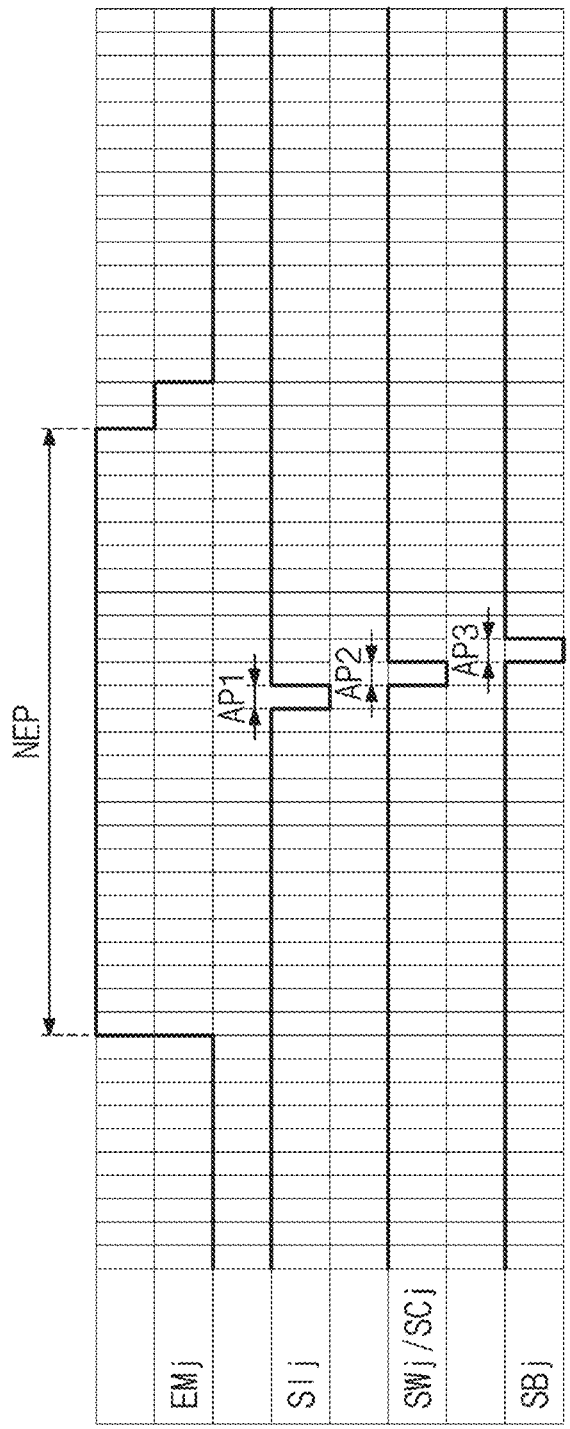
FIG. 4B is a waveform diagram for describing operations of the pixel and the sensor shown in FIG. 4A.

FIG. 4A is a circuit diagram illustrating a pixel and a sensor, according to some embodiments of the present disclosure. FIG. 4B is a waveform diagram for describing operations of the pixel and the sensor shown in FIG. 4A.

Referring to FIGS. 3, 4A, and 4B, the display panel DP includes the plurality of pixels PX and the plurality of sensors FX. The plurality of pixels PX may include red pixels, green pixels, and blue pixels. Each red pixel outputs red light, each green pixel outputs green light, and each blue pixel outputs blue light. The red pixels, the green pixels, and the blue pixels may have substantially the same configuration as one another other than only a wavelength band of the output light. Each of the plurality of pixels PX includes a light emitting element ED and a pixel driving circuit PD for driving the light emitting element ED.

FIG. 4A is an equivalent circuit diagram of one pixel among the plurality of pixels PX shown in FIG. 3. Below, because the plurality of pixels PX have the same circuit structure as one another, additional description associated with the remaining pixels will be replaced by describing a circuit structure of the one pixel PX. Moreover, FIG. 4A illustrates an equivalent circuit diagram of the one sensor FX among the plurality of sensors FX shown in FIG. 3. Below, because the plurality of sensors FX have the same circuit structure as one another, additional description associated with the remaining sensors will be replaced by describing the circuit structure of the one sensor FX.

Referring to FIG. 4A, the pixel PX is connected with the i-th data line DLi of the data lines DL1 to DLm, the j-th initialization scan line SILj of the initialization scan lines SIL1 to SILn, the j-th compensation scan line SCLj of the compensation scan lines SCL1 to SCLn, the j-th write scan line SWLj of the write scan lines SWL1 to SWLn, the j-th black scan line SBLj of the black scan lines SBL1 to SBLn, and the j-th emission control line EMLj of the emission control lines EML1 to EMLn.

The pixel PX includes the light emitting element ED and a pixel driving circuit PD. The light emitting element ED may be a light emitting diode. According to some embodiments of the present disclosure, the light emitting element ED may be an organic light emitting diode including an organic light emitting layer.

The pixel driving circuit PD includes first to fifth transistors T1, T2, T3, T4, and T5, first and second emission control transistors ET1 and ET2, and one capacitor Cst (hereinafter referred to as "a pixel capacitor"). At least one of the first to fifth transistors T1, T2, T3, T4, or T5 and the first and second emission control transistors ET1 and ET2 may be a transistor having a low-temperature polycrystalline silicon (LTPS) semiconductor layer. Each of the first to fifth transistors T1, T2, T3, T4, and T5 and the first and second emission control transistors ET1 and ET2 may be a P-type transistor. A configuration of the pixel driving circuit PD according to the present disclosure is not limited to an embodiment illustrated in FIG. 4A. The pixel driving circuit PD illustrated in FIG. 4A is only an example. For example, the configuration of the pixel driving circuit PD may be modified and implemented. Alternatively, some of the first to fifth transistors T1, T2, T3, T4, and T5 and the first and second emission control transistors ET1 and ET2 may be P-type transistors, and the others thereof may be N-type transistors. Moreover, each of the first to fifth transistors T1, T2, T3, T4, and T5 and the first and second emission control transistors ET1 and ET2 may be an N-type transistor.

According to some embodiments of the present disclosure, each of the first to fifth transistors T1, T2, T3, T4, and T5 and the first and second emission control transistors ET1 and ET2 may be an LTPS transistor. However, embodiments according to the present disclosure are not limited thereto. Alternatively, at least one of the first to fifth transistors T1, T2, T3, T4, or T5 and the first and second emission control transistors ET1 and ET2 may be a oxide semiconductor transistor having an oxide semiconductor layer. For example, each of the third and fourth transistors T3 and T4 may be the oxide semiconductor transistor, and each of the first, second, and fifth transistors T1, T2, and T5 and the first and second emission control transistors ET1 and ET2 may be the LTPS transistor.

The j-th initialization scan line SILj, the j-th compensation scan line SCLj, the j-th write scan line SWLj, the j-th black scan line SBLj, and the j-th emission control line EMLj may transfer a j-th initialization scan signal SIj (or referred to as a "third scan signal"), a j-th compensation scan signal SCj (or referred to as a "second scan signal"), a j-th write scan line SWj (or referred to as a "first scan signal"), a j-th black scan signal SBj (or referred to as a "fourth scan signal"), and a j-th emission control signal EMj to the pixel PX, respectively. The i-th data line DLi transfers an i-th data signal Di to the pixel PX. The i-th data signal Di may have a voltage level corresponding to the image signal RGB (see FIG. 3) input to the display device DD (see FIG. 3).

The first and second driving voltage lines VL1 and VL2 may transfer the first and second driving voltages ELVDD and ELVSS to the pixel PX, respectively. Also, first and second initialization voltage lines VL3 and VL4 may transfer the first and second initialization voltages VINT1 and VINT2 to the pixel PX, respectively.

The first transistor T1 is connected between the first driving voltage line VL1 receiving the first driving voltage ELVDD and the light emitting element ED. The first transistor T1 includes a first electrode connected to the first driving voltage line VL1 via the first emission control transistor ET1, a second electrode connected to an anode electrode of the light emitting element ED via the second emission control transistor ET2, and a third electrode (e.g., a gate electrode) connected to one end (e.g., a first node N1) of the pixel capacitor Cst. The first transistor T1 may receive the data signal Di transferred through the i-th data line DLi depending on a switching operation of the second transistor T2 and then may supply a driving current Id to the light emitting element ED.

The second transistor T2 is connected between the i-th data line DLi and the first electrode of the first transistor T1. The second transistor T2 includes a first electrode connected with the i-th data line DLi, a second electrode connected with the first electrode of the first transistor T1, and a third electrode (e.g., a gate electrode) connected with the j-th write scan line SWLj. The second transistor T2 may be turned on in response to the write scan signal SWj transferred through the j-th write scan line SWLj and then may transfer the i-th data signal Di transferred from the i-th data line DLi to the first electrode of the first transistor T1.

The third transistor T3 is connected between the second electrode of the first transistor T1 and the first node N1. The third transistor T3 includes a first electrode connected with the third electrode of the first transistor T1, a second electrode connected with the second electrode of the first transistor T1, and a third electrode (e.g., a gate electrode) connected with the j-th compensation scan line SCLj. The third transistor T3 may be turned on in response to the j-th compensation scan signal SCj transferred through the j-th compensation scan line SCLj and may connect the third electrode and the second electrode of the first transistor T1. In this case, the first transistor T1 may be diode-connected.

The fourth transistor T4 is connected between the first node N1 and the first initialization voltage line VL3 through which the first initialization voltage VINT1 is applied. The fourth transistor T4 includes a first electrode connected to the first initialization voltage line VL3 through which the first initialization voltage VINT1 is supplied, a second electrode connected to the first node N1, and a third electrode (e.g., a gate electrode) connected to the j-th initialization scan line SILj. The fourth transistor T4 is turned on in response to the j-th initialization scan signal Slj transferred through the j-th initialization scan line SILj. The fourth transistor T4 thus turned on may transfer the first initialization voltage VINT1 to the first node N1 such that a potential of the third electrode of the first transistor T1 (i.e., a potential of the first node N1) is initialized.

The first emission control transistor ET1 includes a first electrode connected with the first driving voltage line VL1, a second electrode connected with the first electrode of the first transistor T1, and a third electrode (e.g., a gate electrode) connected with the j-th emission control line EMLj.

The second emission control transistor ET2 includes a first electrode connected to the second electrode of the first transistor T1, a second electrode connected to the anode electrode (e.g., a second node N2) of the light emitting element ED, and a third electrode (e.g., a gate electrode) connected to j-th emission control line EMLj.

The first and second emission control transistors ET1 and ET2 are simultaneously turned on in response to the j-th emission control signal EMj transferred through the j-th emission control line EMLj. The first driving voltage ELVDD applied through the first emission control transistor ET1 thus turned on may be compensated for through the diode-connected transistor T1 and then may be transferred to the light emitting diode ED.

The fifth transistor T5 includes a first electrode connected to the second initialization voltage line VL4 through which the second initialization voltage VINT2 is supplied, a second electrode connected to the second node N2, and a third electrode (e.g., gate electrode) connected to the j-th black scan line SBLj. A voltage level of the second initialization voltage VINT2 may lower than or equal to that of the first initialization voltage VINT1. According to some embodiments of the present disclosure, each of the first and second initialization voltages VINT1 and VINT2 may be about −3.5 V.

As described above, one end of the pixel capacitor Cst is connected with the third electrode of the first transistor T1, and the other end of the pixel capacitor Cst is connected with the first driving voltage line VL1. A cathode electrode of the light emitting element ED may be connected with the second driving voltage line VL2 that transfers the second driving voltage ELVSS. A voltage level of the second driving voltage ELVSS may be lower than a voltage level of the first driving voltage ELVDD. As According to some embodiments of the present disclosure, the voltage level of the second driving voltage ELVSS may be higher than the voltage level of each of the first and second initialization voltages VINT1 and VINT2. For example, the first driving voltage ELVDD may be approximately 4.6 V, and the second driving voltage ELVSS may be approximately −2.5 V.

Referring to FIGS. 4A and 4B, the j-th emission control signal EMj has a high level during a non-emission period NEP. During the non-emission period NEP, the j-th initialization scan signal Slj is activated. During an activation period AP1 (hereinafter, referred to as a "first activation period") of the j-th initialization scan signal Slj, when the j-th initialization scan signal Slj of a low level is provided through the j-th initialization scan line SILj, the fourth transistor T4 is turned on in response to the j-th initialization scan signal Slj of the low level. The first initialization voltage VINT1 is transferred to the third electrode of the first transistor T1 via the turned-on fourth transistor T4, and the first node N1 is initialized to the first initialization voltage VINT1. Accordingly, the first activation period AP1 may be defined as an initialization period of the pixel PX.

Then, the j-th compensation scan signal SCj and the j-th write scan signal SWj are activated. The j-th compensation scan signal SCj and the j-th write scan signal SWj may be simultaneously activated during a second activation period AP2. According to some embodiments of the present disclosure, the first activation period AP1 may not overlap the second activation period AP2. When the j-th compensation scan signal SCj of a low level is supplied through the compensation scan line SCLj, the third transistor T3 is turned on. The first transistor T1 is diode-connected by the turned-on third transistor T3 to be forward-biased. During the second activation period AP2, the second transistor T2 is turned on by the j-th write scan signal SWj of the low level. In this case, a compensation voltage "Di-Vth" is applied to the third electrode of the first transistor T1. Herein, the compensation voltage "Di-Vth" may correspond to a result of subtracting a threshold voltage Vth of the first transistor T1 from a voltage of the i-th data signal Di supplied from the i-th data line DLi. That is, a potential of the third electrode of the first transistor T1 may be the compensation voltage "Di-Vth".

The first driving voltage ELVDD and the compensation voltage "Di-Vth" may be respectively applied to opposite ends of the pixel capacitor Cst, and charges corresponding to a voltage difference of the opposite ends of the pixel capacitor Cst may be stored in the pixel capacitor Cst. Herein, the second activation period AP2 may be referred to as a compensation period or a write period of the pixel PX.

In the meantime, the j-th black scan signal SBj has a low level during a third activation period AP3. According to some embodiments of the present disclosure, the third activation period AP3 may not overlap the second activation period AP2. During the third activation period AP3, the fifth transistor T5 is turned on by receiving the j-th black scan signal SBj of a low level through the j-th black scan line SBLj. A portion of the driving current Id may be drained through the fifth transistor T5 as a bypass current Ibp. When the fifth transistor T5 is turned on in response to the j-th black scan signal SBj, the potential of the second node N2 may be initialized to the second initialization voltage VINT2.

Assuming that the pixel PX displays a black image, even though a minimum driving current of the first transistor T1 flows as the driving current Id, the light emitting element ED emits light. That is, the pixel PX fails to normally display a black image. Accordingly, the fifth transistor T5 of the pixel PX according to some embodiments of the present disclosure may drain, as the bypass current Ibp, a portion of the minimum driving current of the first transistor T1 to a current path that is different from a current path toward the light emitting element ED. Herein, the minimum driving current of the first transistor T1 means a current flowing to the first transistor T1 under the condition that a gate-source voltage Vgs of the first transistor T1 is smaller than the threshold voltage Vth, that is, the first transistor T1 is turned off. As the minimum driving current (e.g., a current of 10 pA or less) flowing to the first transistor T1 is transferred to the light emitting element ED under the condition that the first transistor T1 is turned off, an image of a black gray scale is displayed. In the case where the pixel PX displays the black image, the bypass current lbp has a relatively large influence on the minimum driving current; in contrast, in the case where the pixel PX displays an image such as a normal image or a white image, there is little influence of the bypass current lbp on the driving current Id. Accordingly, assuming that the pixel PX displays a black image, a current (i.e., the light emitting current led) that corresponds to a result of subtracting the bypass current lbp flowing through the seventh transistor T5 from the driving current Id is provided to the light emitting element ED, and thus a black image may be clearly displayed. Accordingly, the pixel PX may implement an accurate black gray scale image by using the fifth transistor T5, and thus, a contrast ratio may be improved.

Next, the j-th emission control signal EMj that is supplied from the j-th emission control line EMLj transitions from the high level to the low level. The first and second emission control transistors ET1 and ET2 are turned on by the emission control signal EMj of the low level. In this case, because a difference is present between the voltage of the third electrode of the first transistor T1 and the first driving voltage ELVDD, the driving current Id is generated. The driving current Id thus generated is supplied to the light emitting element ED through the second emission control transistor ET2, and thus, a current led flows through the light emitting element ED.

Returning to FIG. 4A, the sensor FX includes a light receiving element OPD and a sensor driving circuit O_SD connected to the light receiving element OPD. The sensor driving circuit O_SD is connected to the d-th readout line RLd among the readout lines RL1 to RLh, the j-th write scan line SWLj, and a reset control line RCL.

The light receiving element OPD may be an organic photodiode including an organic material as a photoelectric conversion layer. A sensing anode electrode of the light receiving element OPD may be connected to a first sensing node SN1. A sensing cathode electrode thereof may be connected to the second driving voltage line VL2 that delivers the second driving voltage ELVSS.

The sensor driving circuit O_SD includes four transistors ST1 to ST4 and one capacitor Cs (hereinafter referred to as a "sensing capacitor"). The four transistors ST1 to ST4 may be a first reset transistor ST1, a second reset transistor ST4, an amplification transistor ST2, and an output transistor ST3, respectively. Also, some of the first reset transistor ST1, the second reset transistor ST4, the amplification transistor ST2, and the output transistor ST3 may be N-type transistors, and the other(s) thereof may be a P-type transistor. According to some embodiments of the present disclosure, the first reset transistor ST1 and the second reset transistor ST4 may be N-type transistors, and the amplification transistor ST2 and the output transistor ST3 may be P-type transistors. According to some embodiments of the present disclosure, the amplification transistor ST2 and the output transistor ST3 may be PMOS transistors, and the first reset transistor ST1 and the second reset transistor ST4 may be NMOS transistors. However, embodiments according to the present disclosure are not limited thereto. For example, all of the first reset transistor ST1, the second reset transistor ST4, the amplification transistor ST2, and the output transistor ST3 may be N-type transistors or P-type transistors.

At least one of the first reset transistor ST1, the second reset transistor ST4, the amplification transistor ST2, or the output transistor ST3 may be an oxide semiconductor transistor. According to some embodiments of the present disclosure, the first reset transistor ST1 and the second reset transistor ST4 may be oxide semiconductor transistors, and the amplification transistor ST2 and the output transistor ST3 may be LTPS transistors. However, embodiments according to the present disclosure are not limited thereto. For example, all of the first reset transistor ST1, the second reset transistor ST4, the amplification transistor ST2, and the output transistor ST3 may be N-type transistors or P-type transistors.

Some (e.g., the amplification transistor ST2 and the output transistor ST3) of the first reset transistor ST1, the second reset transistor ST4, the amplification transistor ST2, and the output transistor ST3 may be transistors having the same type as the first to fifth transistors T1 to T5 of the pixel PX and the first and second emission control transistors ET1 and ET2 of the pixel PX. Some (e.g., the first and second reset transistors ST1 and ST4) of the first reset transistor ST1, the second reset transistor ST4, the amplification transistor ST2, and the output transistor ST3 may be transistors having a type different from that of each of the first to fifth transistors T1 to T5 of the pixel PX and the first and second emission control transistors ET1 and ET2 of the pixel PX.

The circuit configuration of the sensor driving circuit O_SD according to the present disclosure is not limited to that illustrated in FIG. 4A. The sensor driving circuit O_SD illustrated in FIG. 4A is only an example, and the configuration of the sensor driving circuit O_SD may be modified and implemented.

The first reset transistor ST1 includes a first electrode receiving a reset voltage Vrst, a second electrode connected with the first sensing node SN1, and a third electrode receiving a reset control signal RST. The first reset transistor ST1 may reset a potential of the first sensing node SN1 to the reset voltage Vrst in response to the reset control signal RST. The reset control signal RST may be a signal provided through the reset control line RCL. According to some embodiments of the present disclosure, during the at least activation period of the reset control signal RST, the reset voltage Vrst may have a voltage level lower than the second driving voltage ELVSS. The reset voltage Vrst may be a DC voltage maintained at a voltage level lower than the second driving voltage ELVSS. According to some embodiments of the present disclosure, the reset voltage Vrst may be approximately -4.5 V.

The first reset transistor ST1 may include a plurality of sub reset transistors connected to one another in series. For example, the first reset transistor ST1 may include two sub reset transistors (hereinafter referred to as "first and second sub reset transistors"). In this case, a third electrode of the first sub reset transistor and a third electrode of the second sub reset transistor are connected with the reset control line RCL. Also, a second electrode of the first sub reset transistor and a first electrode of the second sub reset transistor may be electrically connected with each other. Also, the reset voltage Vrst may be applied to a first electrode of the first sub reset transistor, and a second electrode of the second sub reset transistor may be electrically connected with the first sensing node SN1. However, the number of sub reset transistors is not limited thereto and may be variously changed or modified.

The second reset transistor ST4 includes a first electrode receiving the reset voltage Vrst, a second electrode connected with a second sensing node SN2, and a third electrode receiving the reset control signal RST. The second reset transistor ST4 may reset a potential of the second sensing node SN2 to the reset voltage Vrst in response to the reset control signal RST. The reset control signal RST may be a signal provided through the reset control line RCL. According to some embodiments of the present disclosure, the third electrode of the first reset transistor ST1 and the third electrode of the second reset transistor ST4 may be commonly connected to the reset control line RCL.

According to some embodiments of the present disclosure, the first electrode of the first reset transistor ST1 and the first electrode of the second reset transistor ST4 may be commonly connected to a reset voltage line VL5 that supplies the reset voltage Vrst. Accordingly, the reset voltage Vrst may be supplied to the first electrode of the first reset transistor ST1 and the first electrode of the second reset transistor ST4 through the reset voltage line VL5.

The second reset transistor ST4 may include a plurality of sub reset transistors connected to one another in series. For example, the second reset transistor ST4 may include two sub reset transistors (hereinafter referred to as "third and fourth sub reset transistors"). In this case, a third electrode of the third sub reset transistor and a third electrode of the fourth sub reset transistor are connected with the reset control line RCL. Also, a second electrode of the third sub reset transistor and a first electrode of the fourth sub reset transistor may be electrically connected with each other. Besides, the reset voltage Vrst may be applied to a first electrode of the third sub reset transistor, and a second electrode of the fourth sub reset transistor may be electrically connected to the second sensing node SN2. However, the number of sub reset transistors is not limited thereto and may be variously changed or modified.

The sensing capacitor Cs may be connected between the first sensing node SN1 and the second sensing node SN2.

The amplification transistor ST2 includes a first electrode receiving a sensing driving voltage SLVD, a second electrode connected with a third sensing node SN3, and a third electrode connected with the second sensing node SN2. The amplification transistor ST2 is turned on depending on the potential of the second sensing node SN2 to apply the sensing driving voltage SLVD to the third sensing node SN3. According to some embodiments of the present disclosure, the sensing driving voltage SLVD may correspond to one of the first driving voltage ELVDD, the first initialization voltage VINT1, and the second initialization voltage VINT2. When the sensing driving voltage SLVD corresponds to the first driving voltage ELVDD, the first electrode of the amplification transistor ST2 may be electrically connected with the first driving voltage line VL1. When the sensing driving voltage SLVD corresponds to the first initialization voltage VINT1, the first electrode of the amplification transistor ST2 may be electrically connected with the first initialization voltage line VL3. When the sensing driving voltage SLVD corresponds to the second initialization voltage VINT2, the first electrode of the amplification transistor ST2 may be electrically connected with the second initialization voltage line VL4.

The output transistor ST3 includes a first electrode connected to the third sensing node SN3, a second electrode connected to the d-th readout line RLd, and a third electrode receiving an output control signal. The output transistor ST3 may deliver a readout signal FSd to the d-th readout line RLd in response to the output control signal. The output control signal may be the j-th write scan signal SWj supplied through the j-th write scan line SWLj. That is, the output transistor ST3 may receive the j-th write scan signal SWj supplied from the j-th write scan line SWLj as the output control signal. FIG. 4A illustrates that the j-th write scan signal SWj is supplied to the output transistor ST3 as the output control signal, but embodiments according to the present disclosure are not limited thereto. For example, the j-th initialization scan signal SIj or the j-th compensation scan signal SCj may be supplied to the output transistor ST3 as the output control signal.

Figure 5:
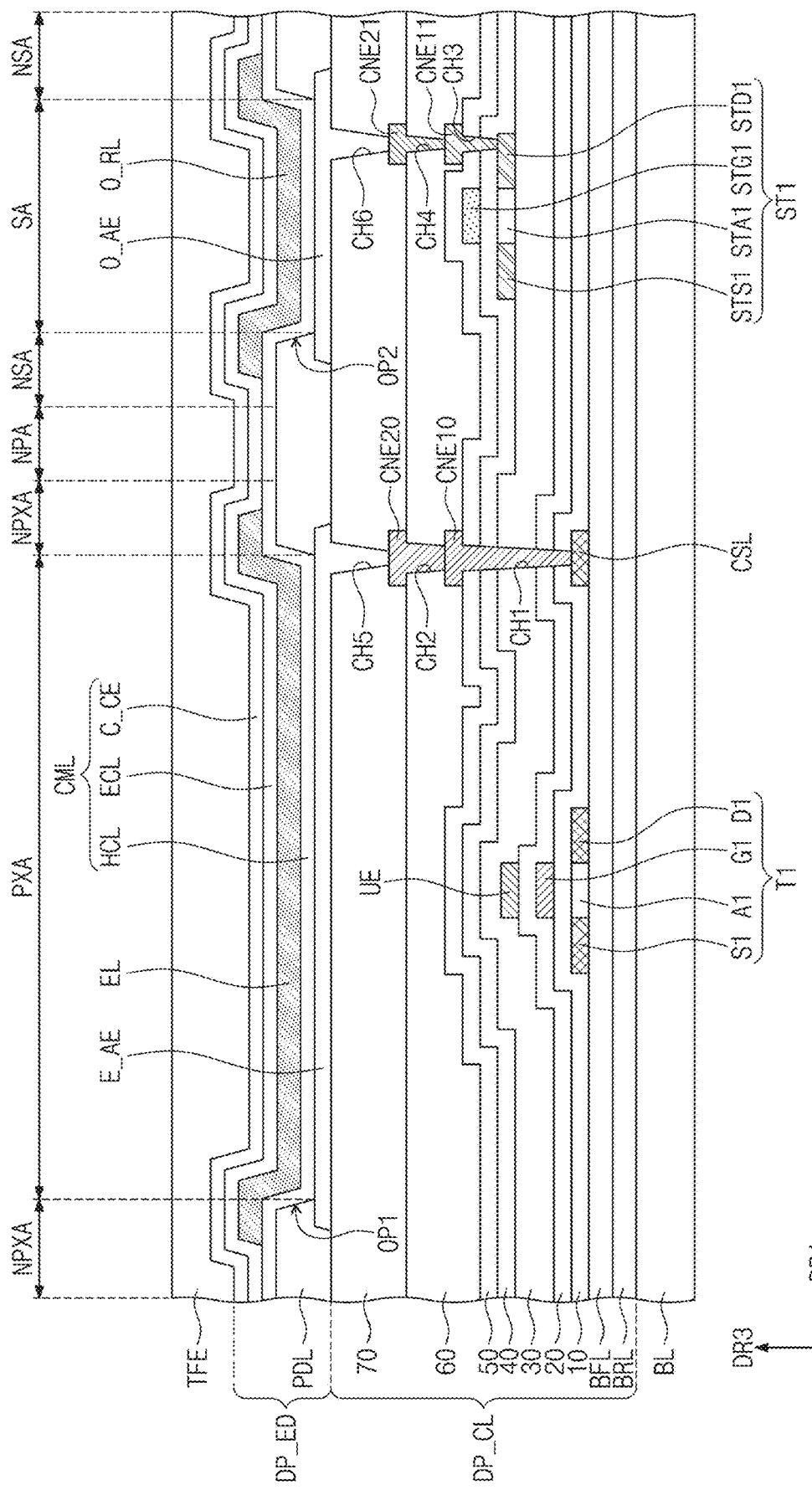
FIG. 5 is a cross-sectional view illustrating a pixel and a sensor of a display panel, according to some embodiments of the present disclosure.

FIG. 5 is a cross-sectional view illustrating a pixel and a sensor of a display panel, according to some embodiments of the present disclosure.

Referring to FIG. 5, the display panel DP includes a base layer BL, a circuit layer DP_CL, and an element layer DP_ED.

The base layer BL may include a synthetic resin layer. The synthetic resin layer may include a thermosetting resin. In detail, the synthetic resin layer may be a polyimide-based resin layer, and the material thereof is not particularly limited thereto. The synthetic resin layer may include at least one of acrylate-based resin, methacrylate-based resin, polyisoprene-based resin, vinyl-based resin, epoxy-based resin, urethane-based resin, cellulose-based resin, siloxane-based resin, polyamide-based resin, or perylene-based resin. Besides, the base layer BL may include a glass substrate, a metal substrate, an organic/inorganic composite substrate, or the like.

At least one inorganic layer is formed on an upper surface of the base layer BL. The inorganic layer may include at least one of aluminum oxide, titanium oxide, silicon oxide, silicon oxynitride, zirconium oxide, or hafnium oxide. The inorganic layer may be formed of multiple layers. The multiple inorganic layers may constitute a barrier layer BRL and/or a buffer layer BFL, which will be described later. The barrier layer BRL and the buffer layer BFL may be arranged selectively.

The circuit layer DP_CL may include the barrier layer BRL and/or the buffer layer BFL. The barrier layer BRL prevents or reduces instances of foreign objects being introduced from the outside. The barrier layer BRL may include a silicon oxide layer and a silicon nitride layer. Each of the silicon oxide layer and the silicon nitride layer may include a plurality of layers, and the plurality of silicon oxide layers and the silicon nitride layers may be alternately stacked.

The buffer layer BFL may be located on the barrier layer BRL. The buffer layer BFL improves a bonding force between the base layer BL and a semiconductor pattern and/or a conductive pattern. The buffer layer BFL may include a silicon oxide layer and a silicon nitride layer. The silicon oxide layer and the silicon nitride layer may be alternately stacked.

A semiconductor pattern is located on the buffer layer BFL. Below, a semiconductor pattern directly located on the buffer layer BFL is defined as a first semiconductor pattern. The first semiconductor pattern may include a silicon semiconductor. The first semiconductor pattern may include polysilicon. However, embodiments according to the present disclosure are not limited thereto. For example, the first semiconductor pattern may include amorphous silicon.

FIG. 5 shows only a part of the first semiconductor pattern, and the first semiconductor pattern may be further located in another area of the pixel PX (see FIG. 4A). An electrical property of the first semiconductor pattern varies depending on whether it is doped or not. The first semiconductor pattern may include a doped area and an undoped area. The doped area may be doped with N-type dopant or P-type dopant. A P-type transistor includes a doped area doped with the P-type dopant, and an N-type transistor includes a doped area doped with the N-type dopant.

The doped area has higher conductivity than the undoped area, and operates substantially as an electrode or signal line. The undoped area corresponds substantially to the active (or channel) of a transistor. In other words, a portion of the first semiconductor pattern may be the active of the transistor, another portion thereof may be a source or drain of the transistor, and the other portion thereof may be a connection signal line (or connection electrode).

As illustrated in FIG. 5, a first electrode S1, a channel portion A1, and a second electrode D1 of the first transistor T1 are formed from the first semiconductor pattern. The first electrode S1 and the second electrode D1 of the first transistor T1 extend in opposite directions from the channel portion A1.

A portion of a connection signal line CSL formed from the semiconductor pattern is illustrated in FIG. 5. According to some embodiments, the connection signal line CSL may be electrically connected with the second electrode of the second emission control transistor ET2 (see FIG. 4A) in a plan view.

A first insulating layer 10 is located on the buffer layer BFL. The first insulating layer 10 overlaps the plurality of pixels PX in common and covers the first semiconductor pattern. The first insulating layer 10 may be an inorganic layer and/or an organic layer, and may have a single-layer or multi-layer structure. The first insulating layer 10 may include at least one of an aluminum oxide, a titanium oxide, a silicon oxide, a silicon oxynitride, a zirconium oxide, or a hafnium oxide. According to some embodiments, the first insulating layer 10 may be a silicon oxide layer having a single layer structure. An insulating layer of the circuit layer DP_CL to be described later as well as the first insulating layer 10 may be an inorganic layer and/or an organic layer, and may have a single layer structure or a multi-layer structure. The inorganic layer may include at least one of the materials described above.

A third electrode G1 of the first transistor T1 is located on the first insulating layer 10. The third electrode G1 may be a portion of a metal pattern. The third electrode G1 of the first transistor T1 overlaps the channel portion A1 of the first transistor T1. In a process of doping the first semiconductor pattern, the third electrode G1 of the first transistor T1 may serve as a mask.

A second insulating layer 20 covering the third electrode G1 is located on the first insulating layer 10. The second insulating layer 20 overlaps the plurality of pixels PX in common. The second insulating layer 20 may be an inorganic layer and/or an organic layer, and may have a single-layer structure or a multi-layer structure. According to some embodiments, the second insulating layer 20 may be a silicon oxide layer having a single layer structure.

An upper electrode UE may be located on the second insulating layer 20. The upper electrode UE may overlap the third electrode G1. The upper electrode UE may be a portion of a metal pattern or a portion of a doped semiconductor pattern. A portion of the third electrode G1 and the upper electrode UE overlapping the portion of the third electrode G1 may define the pixel capacitor Cst (see FIG. 4A). According to some embodiments of the present disclosure, the upper electrode UE may be omitted.

According to some embodiments of the present disclosure, the second insulating layer 20 may be replaced with an insulating pattern. The upper electrode UE is located on the insulating pattern. The upper electrode UE may serve as a mask for forming an insulating pattern from the second insulating layer 20.

A third insulating layer 30 covering the upper electrode UE is located on the second insulating layer 20. According to some embodiments, the third insulating layer 30 may be a silicon oxide layer having a single layer structure. A semiconductor pattern is located on the third insulating layer 30. Below, the semiconductor pattern directly located on the third insulating layer 30 is defined as a second semiconductor pattern. The second semiconductor pattern may include metal oxide. The oxide semiconductor may include a crystalline or amorphous oxide semiconductor. For example, the oxide semiconductor may include oxides of metals (e.g., zinc (Zn), indium (In), gallium (Ga), tin (Sn), titanium (Ti), and the like) or a mixture of the metals (e.g., zinc (Zn), indium (In), gallium (Ga), tin (Sn), titanium (Ti), and the like) and oxides of the metals. The oxide semiconductors may include indium-tin oxide (ITO), indium-gallium-zinc oxide (IGZO), zinc oxide (ZnO), indium-zinc oxide (IZO), zinc-indium oxide (ZIO), indium oxide (InO), titanium oxide (TiO), indium-zinc-tin oxide (IZTO), zinc-tin oxide (ZTO), and the like.

FIG. 5 shows only a part of the second semiconductor pattern. For example, the second semiconductor pattern may be further arranged in another area of the pixel PX. The second semiconductor pattern may include a plurality of areas identified depending on whether the metal oxide is reduced. An area in which the metal oxide is reduced (hereinafter, a reduction area) has higher conductivity than an area in which the metal oxide is not reduced (hereinafter, a non-reduction area). The reduction area substantially has the role of an electrode or signal line. The non-reduction area substantially corresponds to a channel portion of a transistor. In other words, the portion of the second semiconductor pattern may be a channel portion of a transistor, and another portion thereof may be a first electrode or a second electrode of the transistor.

The circuit layer DP_CL may further include a portion of a semiconductor pattern of the sensor driving circuit O_SD (see FIG. 4A). For convenience of description, the first reset transistor ST1 is shown in the semiconductor patterns of the sensor driving circuit O_SD. A first electrode STS1, a channel portion STA1, and a second electrode STD1 of the first reset transistor ST1 are formed from the second semiconductor pattern. According to some embodiments of the present disclosure, the second semiconductor pattern may include metal oxide. The first electrode STS1 and the second electrode STD1 include a metal reduced from a metal oxide semiconductor. The first electrode STS1 and the second electrode STD1 may have a given thickness from an upper surface of the second semiconductor pattern and may include a metal layer including the reduced metal.

A fourth insulating layer 40 is arranged to cover the first electrode STS1, the channel portion STA1, and the second electrode STD1 of the first reset transistor ST1. A third electrode STG1 of the first reset transistor ST1 is located on the fourth insulating layer 40. According to some embodiments, the third electrode STG1 may be a part of the metal pattern. The third electrode STG1 of the first reset transistor ST1 overlaps the channel portion STA1 of the first reset transistor ST1. According to some embodiments, for convenience of description, the one third electrode STG1 is illustrated, but the first reset transistor ST1 may include two third electrodes.

A fifth insulating layer 50 covering the third electrode STG1 is located on the fourth insulating layer 40. According to some embodiments, the fifth insulating layer 50 may include a silicon oxide layer and a silicon nitride layer. The fifth insulating layer 50 may include a plurality of silicon oxide layers and a plurality of silicon nitride layers, which are alternately stacked.

At least one insulating layer is further located on the fifth insulating layer 50. According to some embodiments, a sixth insulating layer 60 and a seventh insulating layer 70 may be located on the fifth insulating layer 50. The sixth insulating layer 60 and the seventh insulating layer 70 may be organic layers and may have a single layer structure or a multi-layer structure. Each of the sixth insulating layer 60 and the seventh insulating layer 70 may be a polyimide-based resin layer having a single layer structure. Embodiments according to the present disclosure are not limited thereto. For example, the sixth insulating layer 60 and the seventh insulating layer 70 may include at least one of acrylate-based resin, methacrylate-based resin, polyisoprene-based resin, vinyl-based resin, epoxy-based resin, urethane-based resin, cellulose-based resin, siloxane-based resin, polyamide-based resin, or perylene-based resin.

A first connection electrode CNE10 may be located on the fifth insulating layer 50. The first connection electrode CNE10 may be connected with the connection signal line CSL through a first contact hole CH1 penetrating the first to fifth insulating layers 10 to 50, and a second connection electrode CNE20 may be connected with the first connection electrode CNE10 through a second contact hole CH2 penetrating the sixth insulating layer 60. According to some embodiments of the present disclosure, at least one of the fifth to seventh insulating layers 50 to 70 may be omitted, and one of the first and second connection electrodes CNE10 and CNE20 may be also omitted.

A third connection electrode CNE11 may be further located on the fifth insulating layer 50. The third connection electrode CNE11 may be connected to the third electrode STD1 of the first reset transistor ST1 through a third contact hole CH3 penetrating the fourth and fifth insulating layers 40 and 50, and a fourth connection electrode CNE21 may be connected to the third connection electrode CNE11 through a fourth contact hole CH4 penetrating the sixth insulating layer 60.

The element layer DP_ED is located on the circuit layer DP_CL. The element layer DP_ED may include an anode electrode E_AE of the light emitting element ED (see FIG. 4A) and a sensing anode electrode O_AE of a light receiving element OPD (see FIG. 4A). As shown in FIG. 5, the anode electrode E_AE may be connected to the second connection electrode CNE20 through a fifth contact hole CH5 penetrating the seventh insulating layer 70. The sensing anode electrode O_AE may be connected to the fourth connection electrode CNE21 through a sixth contact hole CH6 penetrating the seventh insulating layer 70.

The element layer DP_ED further includes a pixel defining layer PDL located on the circuit layer DP_CL. The pixel defining layer PDL may include a light emitting opening OP1 defined to correspond to the light emitting element ED and a light receiving opening OP2 defined to correspond to the light receiving element OPD. At least part of the anode electrode E_AE of the light emitting element ED is exposed. The light emitting opening OP1 of the pixel defining layer PDL may define an emission area PXA. For example, the plurality of pixels PX (see FIG. 3) may be arranged on a plane of the display panel DP (see FIG. 3) depending on a specific rule. An area in which the plurality of pixels PX are arranged may be defined as a pixel area. One pixel area may include the emission area PXA and a non-emission area NPXA adjacent to the emission area PXA. The non-emission area NPXA may surround the emission area PXA.

The light receiving opening OP2 exposes the sensing anode electrode O_AE of the light receiving element OPD. The light receiving opening OP2 of the pixel defining layer PDL may define a light receiving area SA. For example, the plurality of sensors FX (see FIG. 3) may be arranged on a plane of the display panel DP depending on a specific rule. An area in which the plurality of sensors FX are arranged may be defined as a sensing area, and one sensing area may include the light receiving area SA and a non-receiving area NSA adjacent to the light receiving area SA. The non-receiving area NSA may surround the light receiving area SA.

A common layer CML is located on the pixel defining layer PDL. That is, the common layer CML may be formed in common in the plurality of pixels PX (see FIG. 3) and the plurality of sensors FX (see FIG. 3). The common layer CML includes a common cathode electrode C_CE, a hole control layer HCL, and an electron control layer ECL. The common cathode electrode C_CE is connected to the light emitting element ED and the light receiving element OPD in common. The common cathode electrode C_CE may face the sensing anode electrode O_AE and the anode electrode E_AE. The hole control layer HCL and the electron control layer ECL are interposed between the pixel defining layer PDL and the common cathode electrode C_CE. The hole control layer HCL may include a hole transport layer and a hole injection layer, and the electron control layer ECL may include an electron transport layer and an electron injection layer.

The light emitting layer EL is arranged to correspond to the light emitting opening OP1 defined in the pixel defining layer PDL, and the photoelectric conversion layer O_RL is provided to correspond to the light receiving opening OP2 defined in the pixel defining layer PDL. According to some embodiments, the patterned light emitting layer EL is illustrated, but embodiments according to the present disclosure are not limited thereto. A common light emitting layer may be located on the plurality of pixels PX in common. In this case, the common light emitting layer may generate white light or blue light. The light emitting layer EL and the photoelectric conversion layer O_RL are located on the hole control layer HCL. The electron control layer ECL is located on the light emitting layer EL and the photoelectric conversion layer O_RL. The common cathode electrode C_CE is located on the electron control layer ECL. The hole control layer HCL, the electron control layer ECL, and the common cathode electrode C_CE are located in the plurality of pixels PX and the plurality of sensors FX in common.

Figure 6:
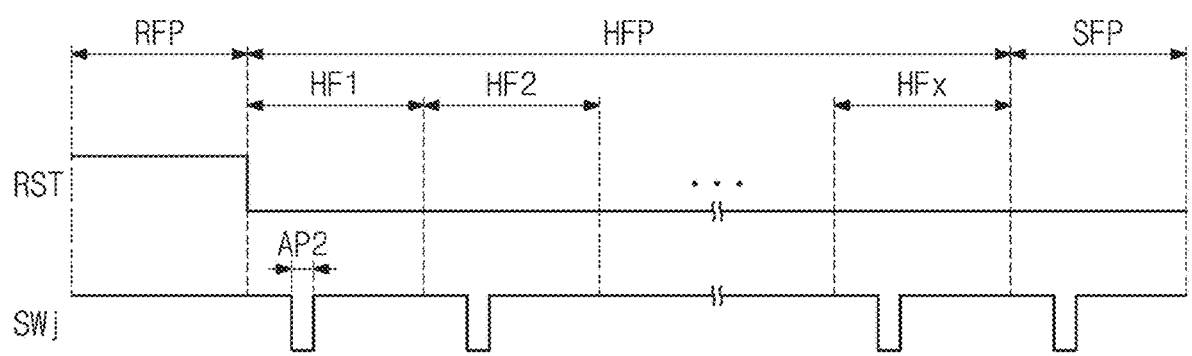
FIG. 6 is a waveform diagram illustrating an operation of a sensor, according to some embodiments of the present disclosure.
Figure 7A:
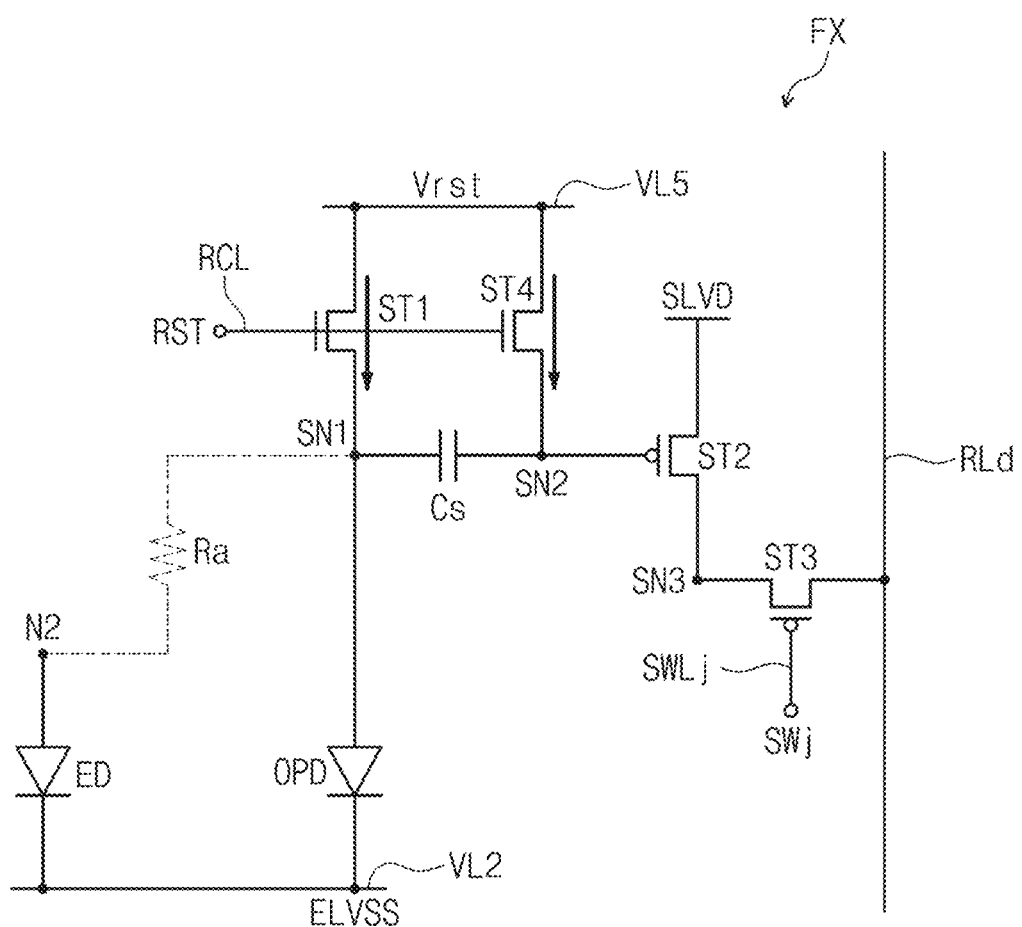
FIGS. 7A to 7C are circuit diagrams illustrating an operation of a sensor, according to some embodiments of the present disclosure.
Figure 7B:
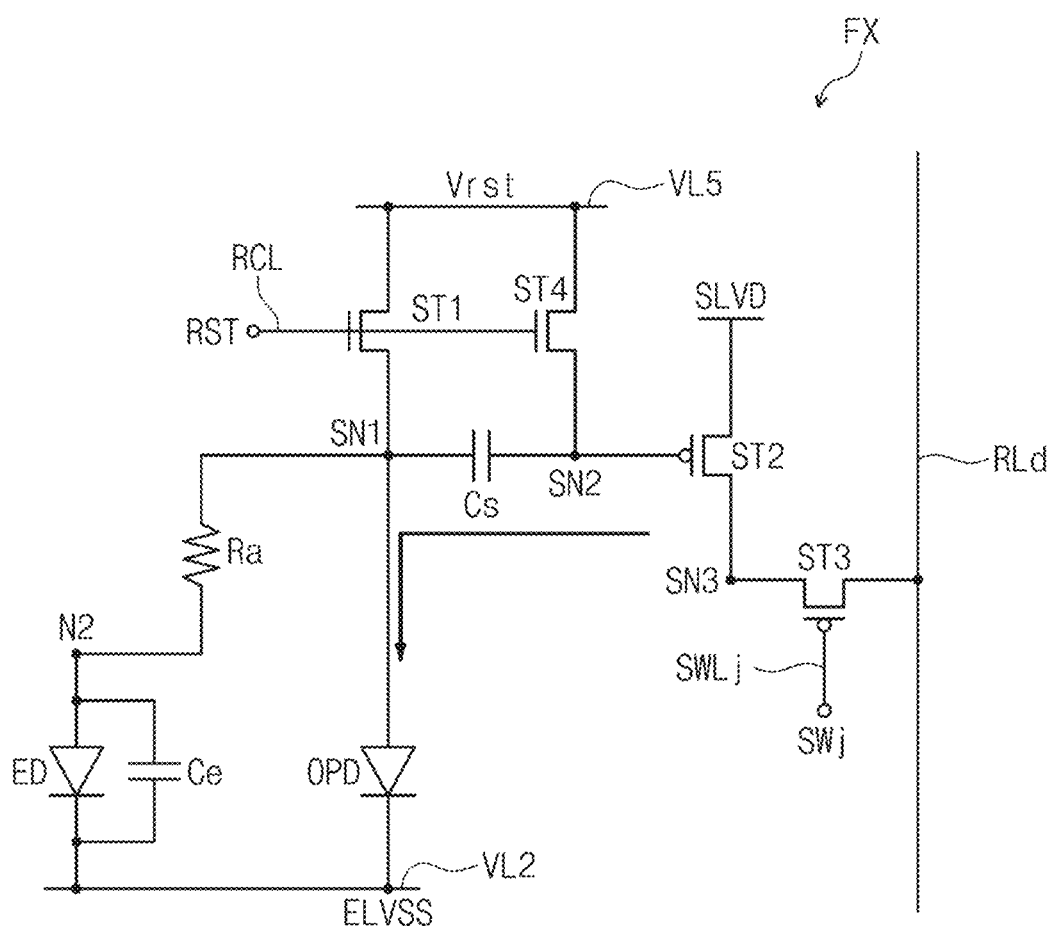
Figure 7C:
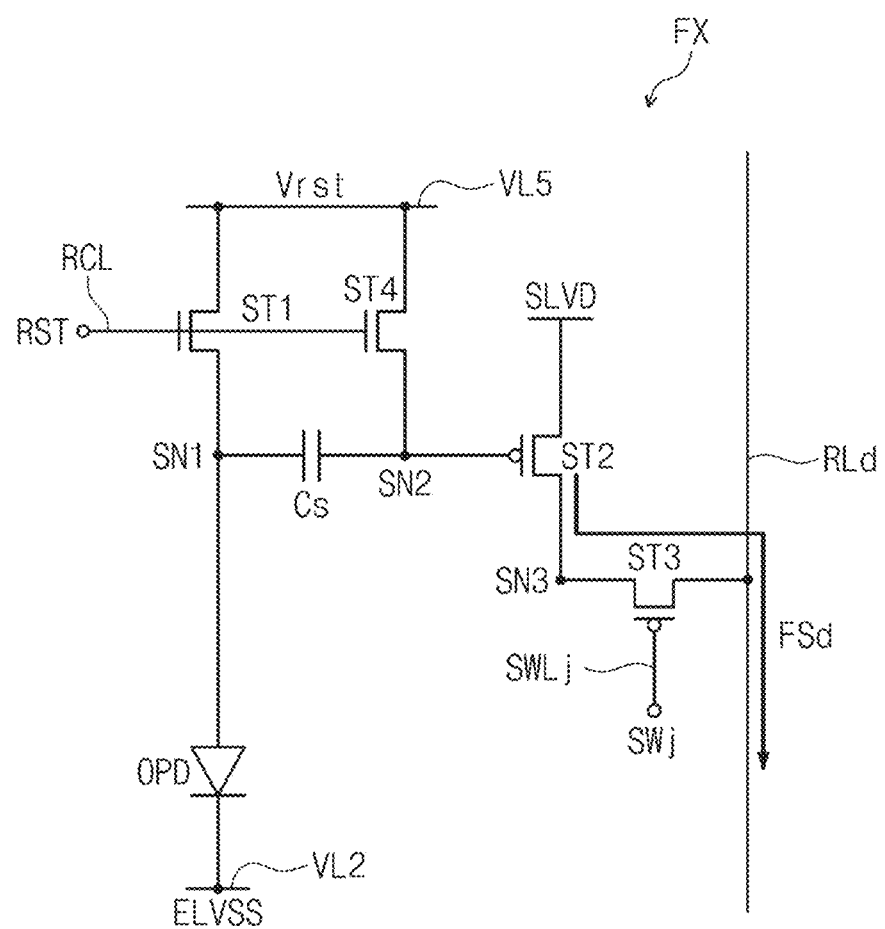
Figure 8:
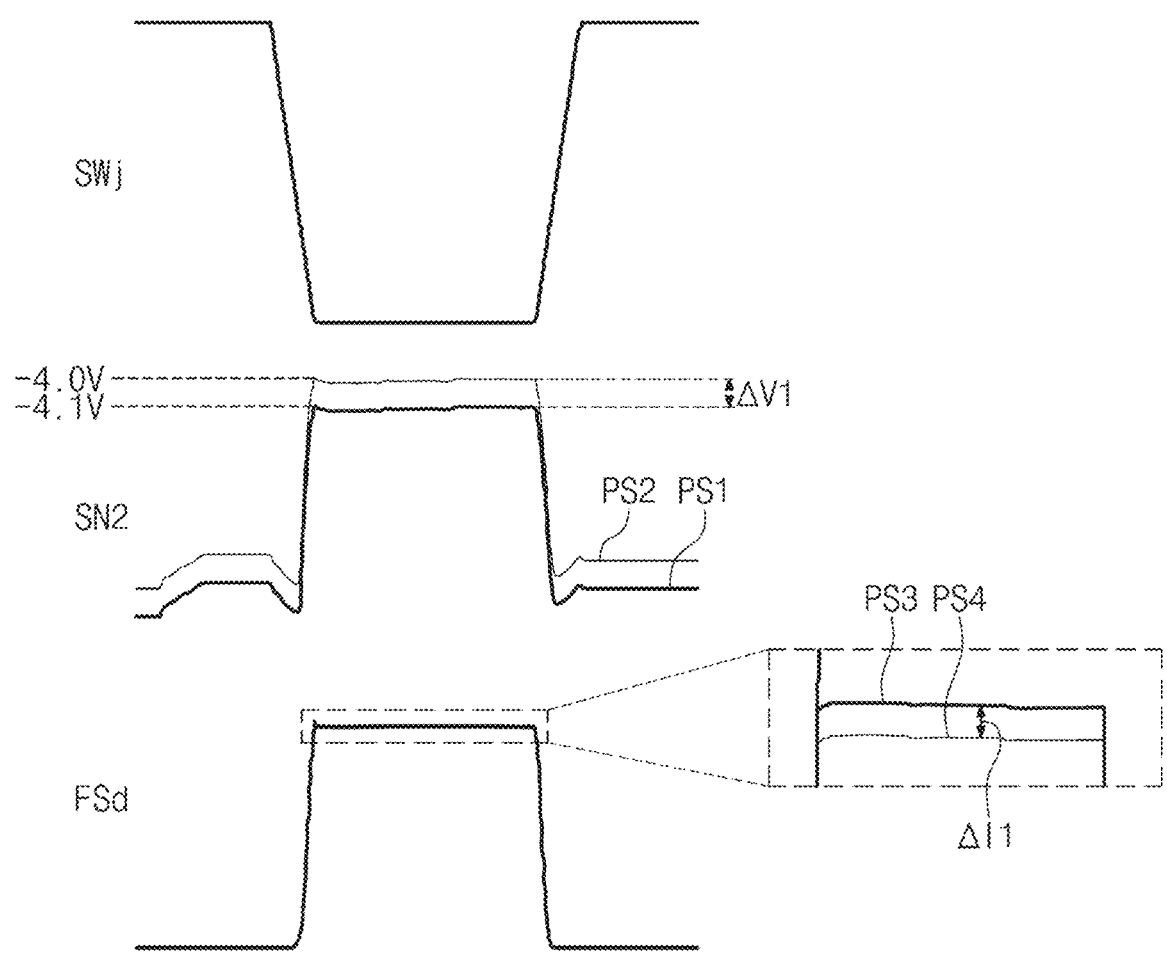
FIG. 8 is a waveform diagram illustrating a potential of a second sensing node and a detection signal, according to some embodiments of the present disclosure.

FIG. 6 is a waveform diagram illustrating an operation of a sensor, according to some embodiments of the present disclosure. FIGS. 7A to 7C are circuit diagrams illustrating an operation of a sensor, according to some embodiments of the present disclosure. FIG. 8 is a waveform diagram illustrating a potential of a second sensing node and a detection signal, according to some embodiments of the present disclosure.

Referring to FIGS. 6 and 7A, when the reset control signal RST of a high level is supplied through the reset control line RCL during a reset period RFP, the first and second reset transistors ST1 and ST4 are turned on. The reset period RFP may be defined as an activation period (i.e., a high-level period) of the reset control line RCL. Alternatively, when the first and second reset transistors ST1 and ST4 are PMOS transistors, the reset control signal RST of the low level may be supplied to the reset control line RCL during the reset period RFP. During the reset period RFP, potentials of the first and second sensing nodes SN1 and SN2 may be reset to a potential corresponding to the reset voltage Vrst. According to some embodiments of the present disclosure, the reset voltage Vrst may have a lower voltage level than the second driving voltage ELVSS.

According to some embodiments of the present disclosure, during the reset period RFP, the light emitting element ED of each of the pixels PX (see FIG. 4A) may not emit light. Because the light emitting element ED of each of the pixels PX is turned off during the reset period RFP, a resistance component Ra may not be present between the second node N2 of each of the pixels PX and the first sensing node SN1 during the reset period RFP.

When the reset period RFP is terminated, the light emitting element ED outputs light during an emission period. Referring to FIGS. 6 and 7B, the light receiving element OPD of the sensor FX may be exposed to light during the emission period of the light emitting element ED. A period in which the sensor FX is exposed to light may be referred to as a "hold period HFP". According to some embodiments of the present disclosure, the hold period HFP may be maintained for a period of several seconds us to tens of seconds μs. The hold period HFP may include a plurality of hold frames HF1 to HFx. The duration of each of the hold frames HF1 to HFx may be the same as the duration of the driving frame of the display panel DP (see FIG. 3). Accordingly, the emission period of the light emitting element ED of each of the pixels PX may be included in each of the hold frames HF1 to HFx. The light may be output from the light emitting element ED provided in each of the pixels PX. According to some embodiments of the present disclosure, the light receiving element OPD may receive light output from a pixel (e.g., a green pixel) emitting specific color light among red pixels, green pixels, and blue pixels.

When a user's hand US_F (see FIG. 1) touches the display surface IS (see FIG. 1), the light receiving element OPD receives light reflected by a ridge or valley between ridges of a fingerprint, and generates photocharges corresponding to the light. The amount of current flowing through the light receiving element OPD is changed by the generated photocharges. When the light receiving element OPD receives the light reflected by the ridge of the fingerprint, the current flowing through the light receiving element OPD may be referred to as a "first current". When the light receiving element OPD receives the light reflected by the valley of the fingerprint, the current flowing through the light receiving element OPD may be referred to as a "second current". Because there is a difference in light intensity between light reflected by the fingerprint's ridge and light reflected by the fingerprint's valley, the difference in light intensity is a difference between the first and second currents. When the first current flows through the light receiving element OPD, a potential of the first sensing node SN1 may be referred to as a "first potential". When the second current flows through the light receiving element OPD, a potential of the first sensing node SN1 may be referred to as a "second potential". According to some embodiments of the present disclosure, the first current may be greater than the second current. In this case, the first potential may be lower than the second potential.

The potential of the first sensing node SN1 may be reflected to the second sensing node SN2 through the sensing capacitor Cs. When a voltage level of the first sensing node SN1 is changed from the reset voltage Vrst to the first potential or second potential, a potential of the second sensing node SN2 may also be changed by being coupled to the first sensing node SN1 by the sensing capacitor Cs. When the first sensing node SN1 has the first potential, the second sensing node SN2 may have a third potential. When the first sensing node SN1 has the second potential, the second sensing node SN2 may have a fourth potential different from the third potential. That is, the potential difference of the first sensing node SN1 by the ridge and valley of the fingerprint may be reflected to the second sensing node SN2 by the sensing capacitor Cs.

The amplification transistor ST2 may be a source follower amplifier generating a source-drain current in proportion to the potential of the second sensing node SN2 input to the third electrode of the amplification transistor ST2. In other words, a source-drain current (hereinafter, referred to as a "first sensing current") of the amplification transistor ST2 in the case where the second sensing node SN2 has the third potential may be different from the source-drain current (hereinafter, referred to as a "second sensing current") of the amplification transistor ST2 in the case where the second sensing node SN2 has the fourth potential.

In FIG. 8, when light reflected by the ridge of the fingerprint is supplied to the light receiving element OPD, a first waveform PS1 indicates the third potential of the second sensing node SN2. When light reflected by the valley of the fingerprint is supplied to the light receiving element OPD, a second waveform PS2 indicates the fourth potential of the second sensing node SN2. A third waveform PS3 indicates a first sensing current, which is output when the second sensing node SN2 has the third potential, as the readout signal FSd. A fourth waveform PS4 indicates a second sensing current, which is output when the second sensing node SN2 has the fourth potential, as the readout signal FSd.

Because the light emitting element ED of each of the pixel PX is turned on during the hold period HFP, the resistance component Ra may be connected between the second node N2 and the first sensing node SN1. When the light emitting element ED is turned on, the resistance component Ra may be generated by the common layer CML that is connected to the light emitting element ED and the light receiving element OPD in common.

Referring to FIGS. 7B and 8, even though the resistance component Ra is connected between the second node N2 and the first sensing node SN1, a potential of the first sensing node SN1 may not increase to the same level as a potential of the second node N2, or the increase may be delayed, by the sensing capacitor Cs coupled between the first sensing node SN1 and the second sensing node SN2. The sensing capacitor Cs may have a capacitance enough to delay the increase in the potential of the first sensing node SN1. According to some embodiments of the present disclosure, when the light emitting element ED emits light, the sensing capacitor Cs may have a capacitance corresponding to a capacitor Ce formed at opposite ends of the light emitting element ED.

When the first sensing node SN1 has the first potential, the second sensing node SN2 may have a third potential. When the first sensing node SN1 has the second potential, the second sensing node SN2 may have a fourth potential different from the third potential. That is, the potential difference of the first sensing node SN1 by the ridge and valley of the fingerprint may be reflected to the second sensing node SN2 by the sensing capacitor Cs. According to some embodiments of the present disclosure, when the reset voltage Vrst is about −4.5 V, the third potential is approximately −4.1 V, the fourth potential may be approximately −4.0 V, and a difference ΔV1 between the third potential and the fourth potential may be about 0.1 V.

As such, the potential of the first sensing node SN1 may be prevented or reduced by connecting the sensing capacitor Cs from increasing to a level equal to the potential of the second node N2 by the resistance component Ra. As a result, a potential difference of the first sensing node SN1 by the ridge and valley of the fingerprint may be accurately reflected to the second sensing node SN2. Accordingly, it may be possible to prevent or reduce the sensing performance of the sensor FX being deteriorated by the resistance component Ra.

Referring to FIGS. 6, 7C, and 8, during the sensing period SFP, each of the sensors FX (see FIG. 4A) may output the readout signal FSd through the corresponding readout line RLd. During the second activation period AP2 of the sensing period SFP, the j-th write scan signal SWj of a low level is supplied to the output transistor ST3 through the j-th write scan line SWLj. When the output transistor ST3 is turned on in response to the j-th write scan signal SWj of the low level, the readout signal FSd corresponding to the first sensing current or a second sensing current flowing through the amplification transistor ST2 may be output to the d-th readout line RLd. As a potential difference of the first sensing node SN1 by the ridge and valley of the fingerprint is accurately reflected to the second sensing node SN2, the first current difference ΔI1 may be clearly shown between the first sensing current and the second sensing current. Accordingly, the sensing accuracy of the sensor FX may be improved.

Figure 9A:
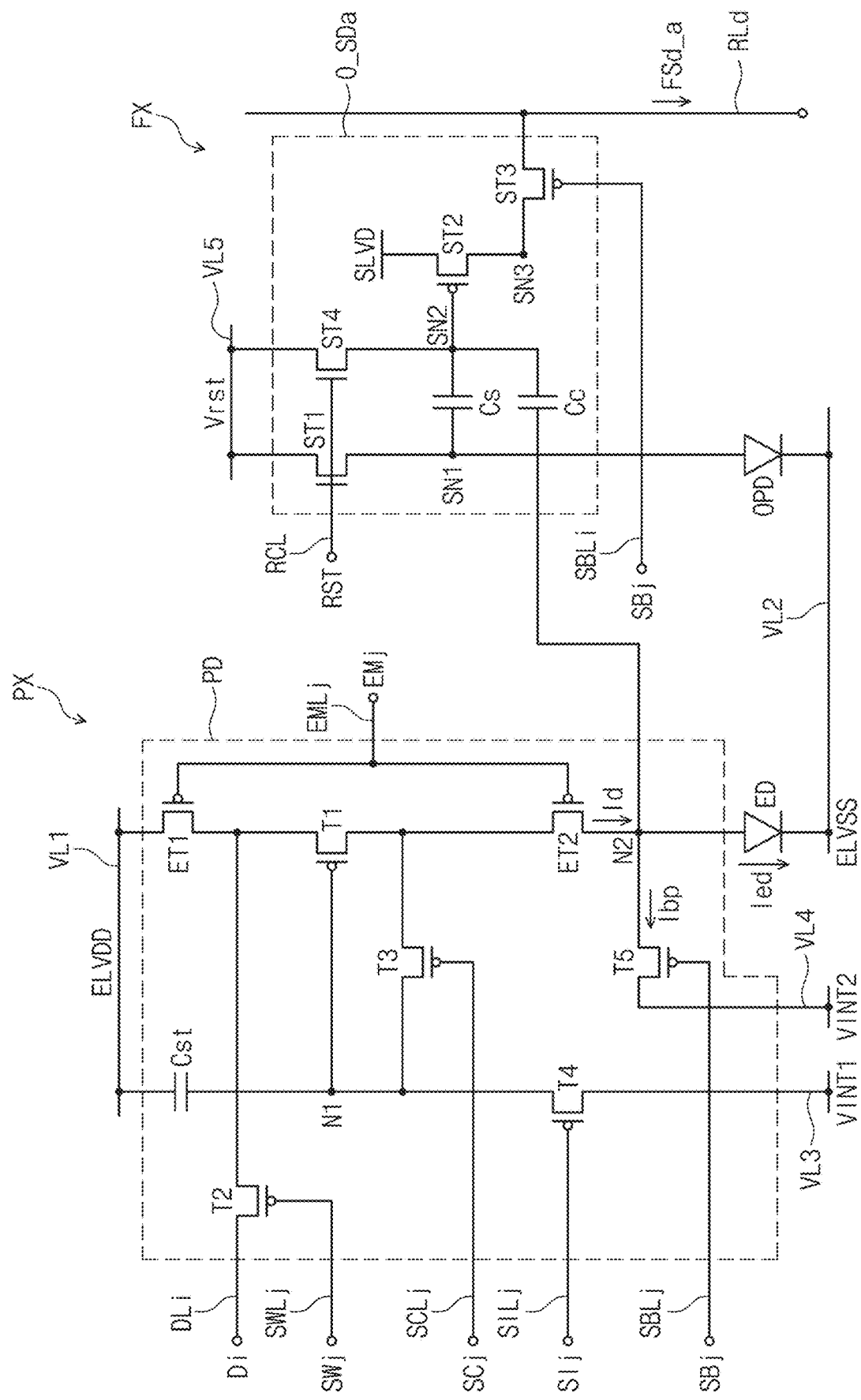
FIG. 9A is a circuit diagram illustrating a pixel and a sensor, according to some embodiments of the present disclosure.
Figure 9B:
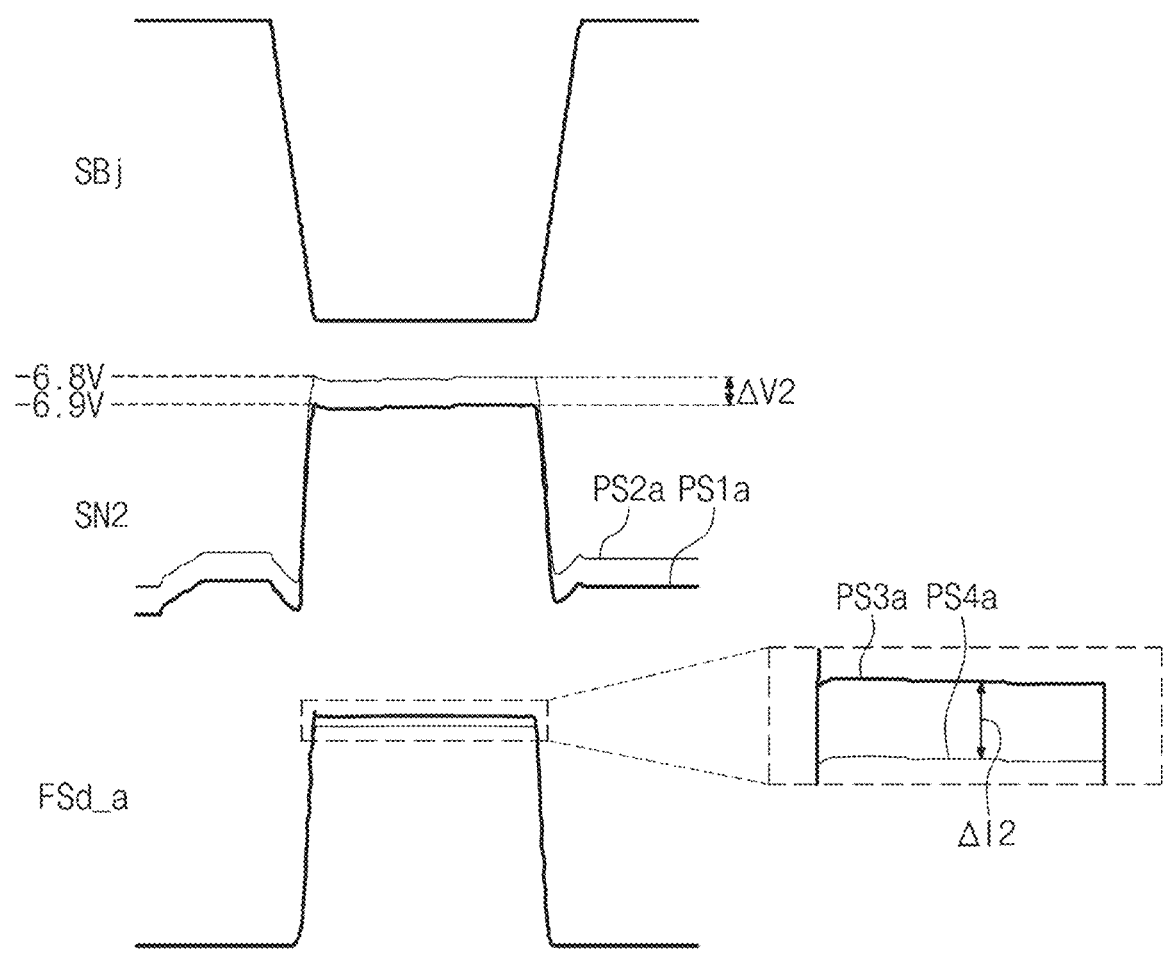
FIG. 9B is a waveform diagram illustrating a potential of a second sensing node and a detection signal illustrated in FIG. 9A.

FIG. 9A is a circuit diagram illustrating a pixel and a sensor, according to some embodiments of the present disclosure. FIG. 9B is a waveform diagram illustrating a potential of a second sensing node and a detection signal illustrated in FIG. 9A. However, the same reference numerals are given to the same components as those shown in FIGS. 4A and 8 among the components shown in FIGS. 9A and 9B, and thus a detailed description thereof will be omitted to avoid redundancy.

Referring to FIG. 9A, the sensor FX includes the light receiving element OPD and a sensor driving circuit O_SDa. The sensor driving circuit O_SDa includes four transistors ST1 to ST4 and two capacitors Cs and Cc. The four transistors ST1 to ST4 may be a first reset transistor ST1, a second reset transistor ST4, an amplification transistor ST2, and an output transistor ST3, respectively. The first reset transistor ST1, the second reset transistor ST4, and the amplification transistor ST2 are the same as the first reset transistor ST1, the second reset transistor ST4, and the amplification transistor ST2, which are illustrated in FIG. 4A, and thus a detailed description thereof will be omitted to avoid redundancy.

The two capacitors Cs and Cc include the sensing capacitor Cs and a down capacitor Cc. The sensing capacitor Cs may be connected between the first sensing node SN1 and the second sensing node SN2. The down capacitor Cc may be coupled between the second node N2 and the second sensing node SN2.

The output transistor ST3 includes a first electrode connected to the third sensing node SN3, a second electrode connected to the d-th readout line RLd, and a third electrode receiving an output control signal. The output transistor ST3 may deliver a readout signal FSd_a to the d-th readout line RLd in response to the output control signal. The output control signal may be the j-th black scan signal SBj that is supplied through the j-th black scan line SBLj. That is, the output transistor ST3 may receive the j-th black scan signal SBj provided from the j-th black scan line SBLj as the output control signal.

In FIG. 9B, when light reflected by a ridge of a fingerprint is supplied to the light receiving element OPD, a fifth waveform PS1a indicates a fifth potential of the second sensing node SN2. When light reflected by a valley of the fingerprint is supplied to the light receiving element OPD, a sixth waveform PS2a indicates a sixth potential of the second sensing node SN2. A seventh waveform PS3a indicates a first sensing current, which is output when the second sensing node SN2 has the fifth potential, as the readout signal FSd_a. An eighth waveform PS4a indicates a second sensing current, which is output when the second sensing node SN2 has the sixth potential, as the readout signal FSd_a.

Referring to FIGS. 4B, 9A, and 9B, when the fifth transistor T5 is turned on during the third activation period AP3 in response to the j-th black scan signal SBj, the potential of the second node N2 may be initialized (or reduced) to the second initialization voltage VINT2. At this time, the potential of the second sensing node SN2 may be reduced by being coupled by the down capacitor Cc. For example, when the down capacitor Cc is connected thereto in the case where the third potential of the second sensing node SN2 has been about −4.1 V (see FIG. 8) in a structure (see FIG. 4A) where the down capacitor Cc is not connected thereto, the third potential of the second sensing node SN2 may decrease to the fifth potential (approximately −6.9 V) during the initialization of the second node N2. When the down capacitor Cc is connected thereto in the case where the fourth potential of the second sensing node SN2 has been about −4.0 V (see FIG. 8) in a structure (see FIG. 4A) where the down capacitor Cc is not connected thereto, the fourth potential of the second sensing node SN2 may decrease to approximately the sixth potential (approximately −6.8 V) during the initialization of the second node N2. That is, the potential of the second sensing node SN2 may be lowered without reducing the voltage level of the reset voltage Vrst.

When the potential of the second sensing node SN2 is lowered to the fifth potential or the sixth potential, a difference ΔI2 between the first sensing current and the second sensing current output from the amplification transistor ST2 may be increased by the current-voltage characteristics of a transistor. That is, even though the difference ΔV2 between the fifth potential and the sixth potential of the second sensing node SN2 is the same as the difference ΔV1 (see FIG. 8) between the third potential and the fourth potential, the difference ΔI2 between the first sensing current and the second sensing current may be much greater than the difference ΔI1 (see FIG. 8) between the first sensing current and the second sensing current.

As such, as the difference ΔI2 between the first sensing current and the second sensing current increases, the sensing accuracy (i.e., the ability to distinguish between a valley and a ridge) of the sensor FX may be improved.

Figure 10A:
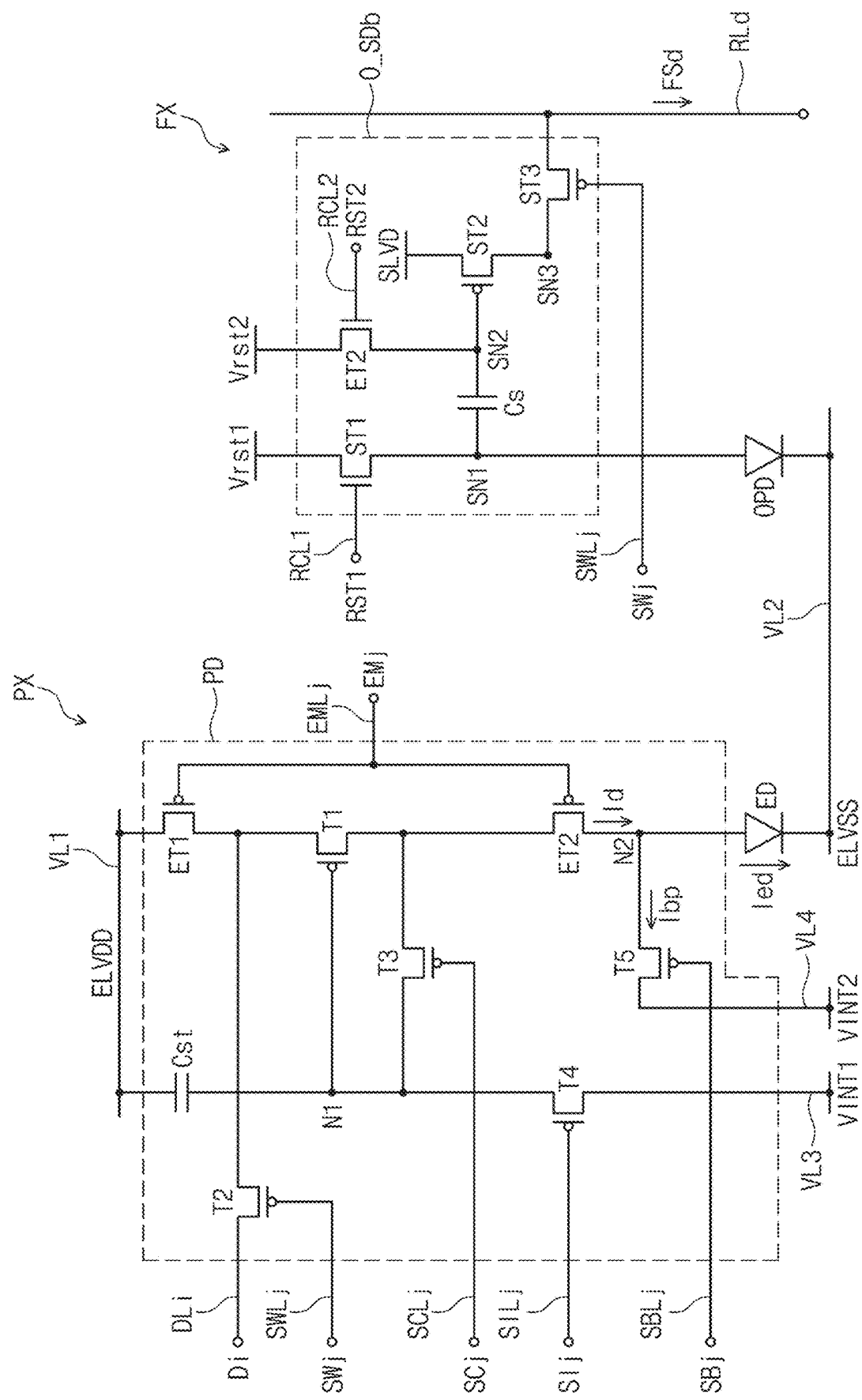
FIG. 10A is a circuit diagram illustrating a pixel and a sensor, according to some embodiments of the present disclosure.
Figure 10B:
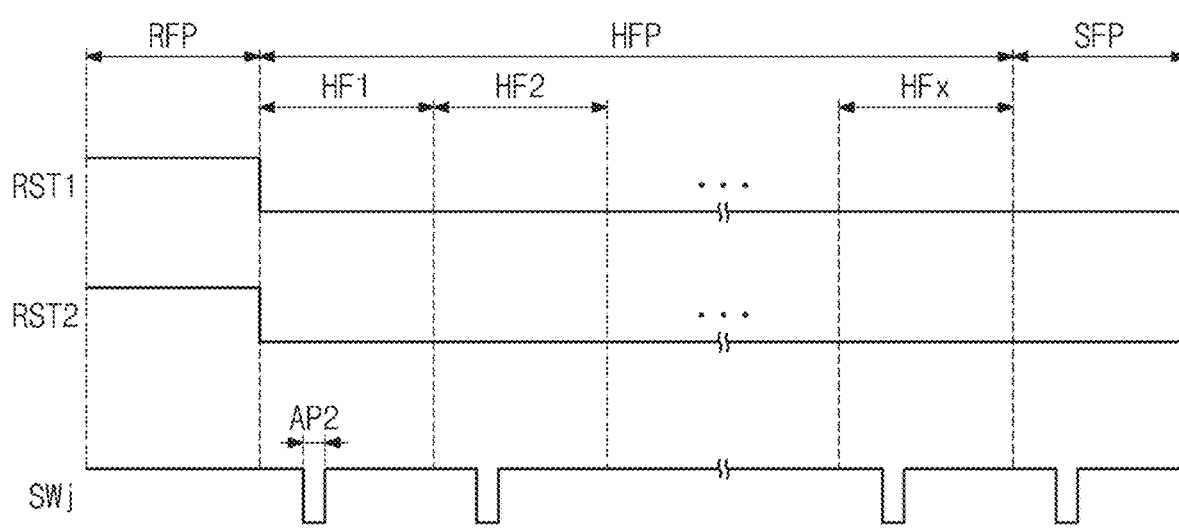
FIG. 10B is a waveform diagram illustrating an operation of the sensor shown in FIG. 10A.

FIG. 10A is a circuit diagram illustrating a pixel and a sensor, according to some embodiments of the present disclosure. FIG. 10B is a waveform diagram illustrating an operation of the sensor shown in FIG. 10A. However, the same reference numerals are given to the same components as those shown in FIGS. 4A and 6 among the components shown in FIGS. 10A and 10B, and thus a detailed description thereof will be omitted to avoid redundancy.

Referring to FIG. 10A, the sensor FX includes the light receiving element OPD and a sensor driving circuit O_SDb. The sensor driving circuit O_SDb includes four transistors ST1 to ST4 and the sensing capacitor Cs. The four transistors ST1 to ST4 may be a first reset transistor ST1, a second reset transistor ST4, an amplification transistor ST2, and an output transistor ST3, respectively. The sensing capacitor Cs, the amplification transistor ST2, and the output transistor ST3 are the same as the sensing capacitor Cs, the amplification transistor ST2, and the output transistor ST3, which are illustrated in FIG. 4A, and thus a detailed description thereof will be omitted to avoid redundancy.

The first reset transistor ST1 includes a first electrode receiving a first reset voltage Vrst1, a second electrode connected with the first sensing node SN1, and a third electrode receiving a first reset control signal RST1. The first reset transistor ST1 may reset a potential of the first sensing node SN1 to the first reset voltage Vrst1 in response to the first reset control signal RST1. The first reset control signal RST1 may be a signal provided through a first reset control line RCL1. According to some embodiments of the present disclosure, during the at least activation period of the first reset control signal RST1, the first reset voltage Vrst1 may have a voltage level lower than the second driving voltage ELVSS. The first the reset voltage Vrst1 may be a DC voltage maintained at a voltage level lower than the second driving voltage ELVSS. According to some embodiments of the present disclosure, the first reset voltage Vrst1 may be approximately −4.5 V.

The second reset transistor ST4 includes a first electrode receiving a second reset voltage Vrst2, a second electrode connected with the second sensing node SN2, and a third electrode receiving a second reset control signal RST2. The second reset transistor ST4 may reset a potential of the second sensing node SN2 to the second reset voltage Vrst2 in response to the second reset control signal RST2. The second reset control signal RST2 may be a signal provided through the second reset control line RCL2. According to some embodiments of the present disclosure, the second reset control line RCL2 may be electrically insulated from the first reset control line RCL1. According to some embodiments of the present disclosure, during the at least activation period of the second reset control signal RST2, the second reset voltage Vrst2 may have a voltage level lower than the second driving voltage ELVSS. The second reset voltage Vrst2 may be a DC voltage maintained at a voltage level lower than the second driving voltage ELVSS. The second reset voltage Vrst2 may have a lower voltage level than the first reset voltage Vrst1. According to some embodiments of the present disclosure, when the first reset voltage Vrst1 is approximately −4.5 V, the second reset voltage Vrst2 may be a voltage between approximately −6 V and −7 V.

Referring to FIGS. 10A and 10B, when the first and second reset control signals RST1 and RST2 of high levels are respectively supplied through the first and second reset control line RCL1 and RCL2 during the reset period RFP, the first and second reset transistors ST1 and ST4 are simultaneously turned on. During the reset period RFP, a potential of the first sensing node SN1 may be reset to a potential corresponding to the first reset voltage Vrst1, and a potential of the second sensing node SN2 may be reset to a potential corresponding to the second reset voltage Vrst2.

When the reset period RFP is terminated, the light emitting element ED outputs light during an emission period. The light receiving element OPD of the sensor FX may be exposed to light during the emission period of the light emitting element ED. A period in which the sensor FX is exposed to light may be referred to as a "hold period HFP". According to some embodiments of the present disclosure, the hold period HFP may be maintained for a period of several seconds us to tens of seconds μs. The hold period HFP may include a plurality of hold frames HF1 to HFx.

The potential of the first sensing node SN1 may be reflected to the second sensing node SN2 through the sensing capacitor Cs. When a voltage level of the first sensing node SN1 is changed from the first reset voltage Vrst1 to the first potential or second potential, a potential of the second sensing node SN2 may also be changed by being coupled to the first sensing node SN1 by the sensing capacitor Cs. When the first sensing node SN1 has the first potential, the second sensing node SN2 may have a third potential. When the first sensing node SN1 has the second potential, the second sensing node SN2 may have a fourth potential different from the third potential. That is, the potential difference of the first sensing node SN1 by a ridge of a fingerprint and a valley of the fingerprint may be reflected to the second sensing node SN2 by the sensing capacitor Cs. Because the second sensing node SN2 is coupled based on a potential corresponding to the second reset voltage Vrst2 lower than the first reset voltage Vrst1 of the first sensing node SN1, the potential of the second sensing node SN2 may be lower than the potential of the first sensing node SN1. For example, when the first reset voltage is about −4.5 V, the first and second potentials of the first sensing node SN1 may be about −4.1 V and about −4.0 V, respectively. When the second reset voltage is about −6 V, the third and fourth potentials of the second sensing node SN2 may be about −5.7 V and about −5.6 V, respectively.

Afterward, during the sensing period SFP, each of the sensors FX (see FIG. 4A) may output the readout signal FSd through the corresponding readout line RLd. During the second activation period AP2 of the sensing period SFP, the j-th write scan signal SWj of a low level is supplied to the output transistor ST3 through the j-th write scan line SWLj. When the output transistor ST3 is turned on in response to the j-th write scan signal SWj of the low level, the readout signal FSd corresponding to a first sensing current or a second sensing current flowing through the amplification transistor ST2 may be output to the d-th readout line RLd.

When the potential of the second sensing node SN2 is lowered to the third potential or the fourth potential, a difference between the first sensing current and the second sensing current, which are output from the amplification transistor ST2, may be increased by the current-voltage characteristics of a transistor. In other words, even though a difference between the third potential and the fourth potential of the second sensing node SN2 and the difference between the first potential and the second potential of the first sensing node SN1 are the same as each other and are about 0.1 V, a difference between the first sensing current and the second sensing current may be great.

As such, the difference between the first sensing current and the second sensing current may be increased by supplying the first and second reset voltages Vrst1 and Vrst2 at different voltage levels. As a result, the sensing accuracy (i.e., the ability to distinguish between a valley and a ridge) of the sensor FX may be improved.

Figure 11A:
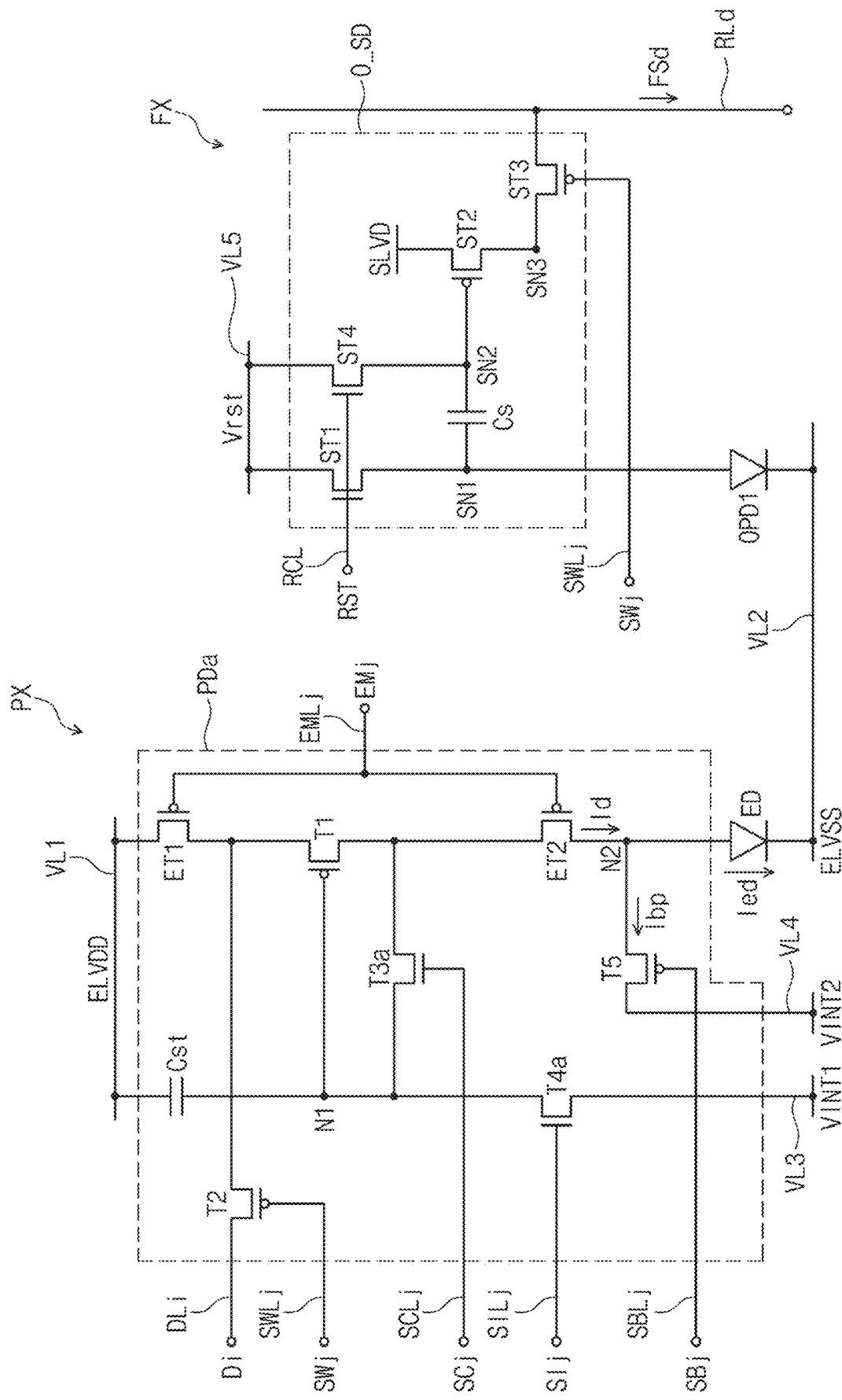
FIG. 11A is a circuit diagram illustrating a pixel and a sensor, according to some embodiments of the present disclosure.
Figure 11B:
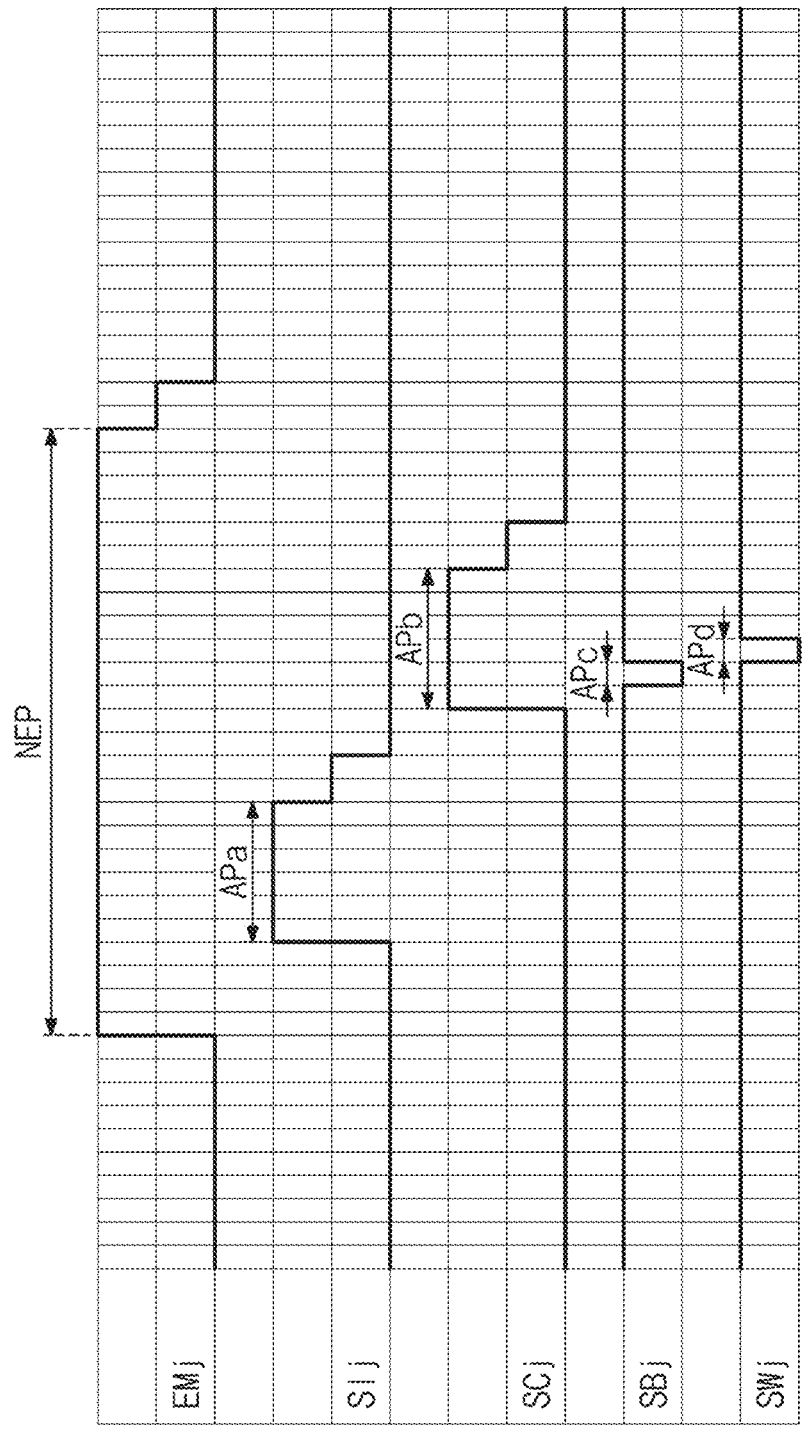
FIG. 11B is a waveform diagram for describing operations of the pixel and the sensor shown in FIG. 11A.

FIG. 11A is a circuit diagram illustrating a pixel and a sensor, according to some embodiments of the present disclosure. FIG. 11B is a waveform diagram for describing operations of the pixel and the sensor shown in FIG. 11A. However, the same reference numerals are given to the same components as those shown in FIGS. 4A and 4B among the components shown in FIGS. 11A and 11B, and thus a detailed description thereof will be omitted to avoid redundancy.

Referring to FIG. 11A, a pixel driving circuit PDa includes first to fifth transistors T1, T2, T3a, T4a, and T5, first and second emission control transistors ET1 and ET2, and one pixel capacitor Cst. At least one of the first to fifth transistors T1, T2, T3a, T4a, or T5 and the first and second emission control transistors ET1 and ET2 may be a transistor having an LTPS semiconductor layer. Some of the first to fifth transistors T1, T2, T3a, T4a, and T5 and the first and second emission control transistors ET1 and ET2 may be P-type transistors, and the others thereof may be N-type transistors. For example, the first, second, and fifth transistors T1, T2, and T5 and the first and second emission control transistors ET1 and ET2 are P-type transistors, and the third and fourth transistors T3a and T4a may be N-type transistors. At least one of the first to fifth transistors T1, T2, T3a, T4a, or T5 and the first and second emission control transistors ET1 and ET2 may be a transistor having an oxide semiconductor layer. For example, the third and fourth transistors T3a and T4a may be oxide semiconductor transistors, and the first, second, and fifth transistors T1, T2, and T5 and the first and second emission control transistors ET1 and ET2 may be LTPS transistors.

Referring to FIGS. 11A and 11B, the j-th emission control signal EMj has a high level during a non-emission period NEP. During the non-emission period NEP, the j-th initialization scan signal Slj is activated. During an activation period APa (hereinafter, referred to as a "first activation period") of the j-th initialization scan signal Slj, when the j-th initialization scan signal Slj of a high level is provided through the j-th initialization scan line SILj, the fourth transistor T4a is turned on in response to the j-th initialization scan signal Slj of the high level. The first initialization voltage VINT1 is transferred to the third electrode of the first transistor T1 via the fourth transistor T4a thus turned on, and the first node N1 is initialized to the first initialization voltage VINT1.

Next, the j-th compensation scan signal SCj is activated, and the third transistor T3a is turned on when the j-th compensation scan signal SCj of the high level is supplied through the j-th compensation scan line SCLj during an activation period APb (hereinafter, referred to as a "second activation period") of the j-th compensation scan signal SCj. The first transistor T1 is diode-connected by the third transistor T3a thus turned on to be forward-biased. The first activation period APa may not overlap the second activation period APb.

The j-th black scan signal SBj is activated within the second activation period APb of the j-th compensation scan signal SCj. The j-th black scan signal SBj has a low level during the activation period APc (hereinafter, referred to as a "third activation period"). During the third activation period APc, the fifth transistor T5 is turned on by receiving the j-th black scan signal SBj of a low level through the j-th black scan line SBLj. A portion of the driving current Id may be drained through the fifth transistor T5 as a bypass current Ibp. The third activation period APc may overlap the second activation period APb. The duration of the second activation period APb may be greater than the duration of the third activation period APc.

The j-th write scan signal SWj is activated within the second activation period APb. The j-th write scan signal SWj has a low level during an activation period APd (hereinafter, referred to as a "fourth activation period"). During the fourth activation period APd, the second transistor T2 is turned on by the j-th write scan signal SWj of the low level. In this case, a compensation voltage "Di-Vth" is applied to the third electrode of the first transistor T1. Here, the compensation voltage "Di-Vth" may correspond to a result of subtracting a threshold voltage Vth of the first transistor T1 from a voltage of the i-th data signal Di supplied from the i-th data line DLi. That is, a potential of the third electrode of the first transistor T1 may be the compensation voltage "Di-Vth". The fourth activation period APd may overlap the second activation period APb. The duration of the second activation period APb may be greater than a duration of the fourth activation period APd. The third activation period APc may precede the fourth activation period APd, and may not overlap the fourth activation period APd.

Next, the j-th emission control signal EMj that is supplied from the j-th emission control line EMLj transitions from the high level to the low level. The first and second emission control transistors ET1 and ET2 are turned on by the emission control signal EMj of the low level. In this case, because a difference is present between the voltage of the third electrode of the first transistor T1 and the first driving voltage ELVDD, the driving current Id is generated. The driving current Id thus generated is supplied to the light emitting element ED through the second emission control transistor ET2, and thus, a current led flows through the light emitting element ED.

The sensor driving circuit O_SD includes four transistors ST1 to ST4 and the sensing capacitor Cs. The four transistors ST1 to ST4 may be a first reset transistor ST1, a second reset transistor ST4, an amplification transistor ST2, and an output transistor ST3, respectively. Some (e.g., the first and second reset transistors ST1 and ST4) of the first reset transistor ST1, the second reset transistor ST4, the amplification transistor ST2, and the output transistor ST3 may be transistors having the same type as the third and fourth transistors T3a and T4a. A type of each of the amplification transistor ST2 and the output transistor ST3 may be the same as that of each of the first, second, and fifth transistors T1, T2, and T5 and the first and second emission control transistors ET1 and ET2.

The first and second reset transistors ST1 and ST4 may receive the reset control signal RST through the reset control line RCL in common. However, embodiments according to the present disclosure are not limited thereto. Alternatively, the reset control signal RST may be the j-th compensation scan signal SCj supplied through the j-th compensation scan line SCLj. That is, the first and second reset transistors ST1 and ST4 may receive the j-th compensation scan signal SCj supplied from the j-th compensation scan line SCLj as the reset control signal RST. When the reset control signal RST is the j-th compensation scan signal SCj supplied through the j-th compensation scan line SCLj, the third electrode of the first reset transistor ST1 and the third electrode of the second reset transistor ST4 may be connected to the j-th compensation scan line SCLj in common.

Figure 12:
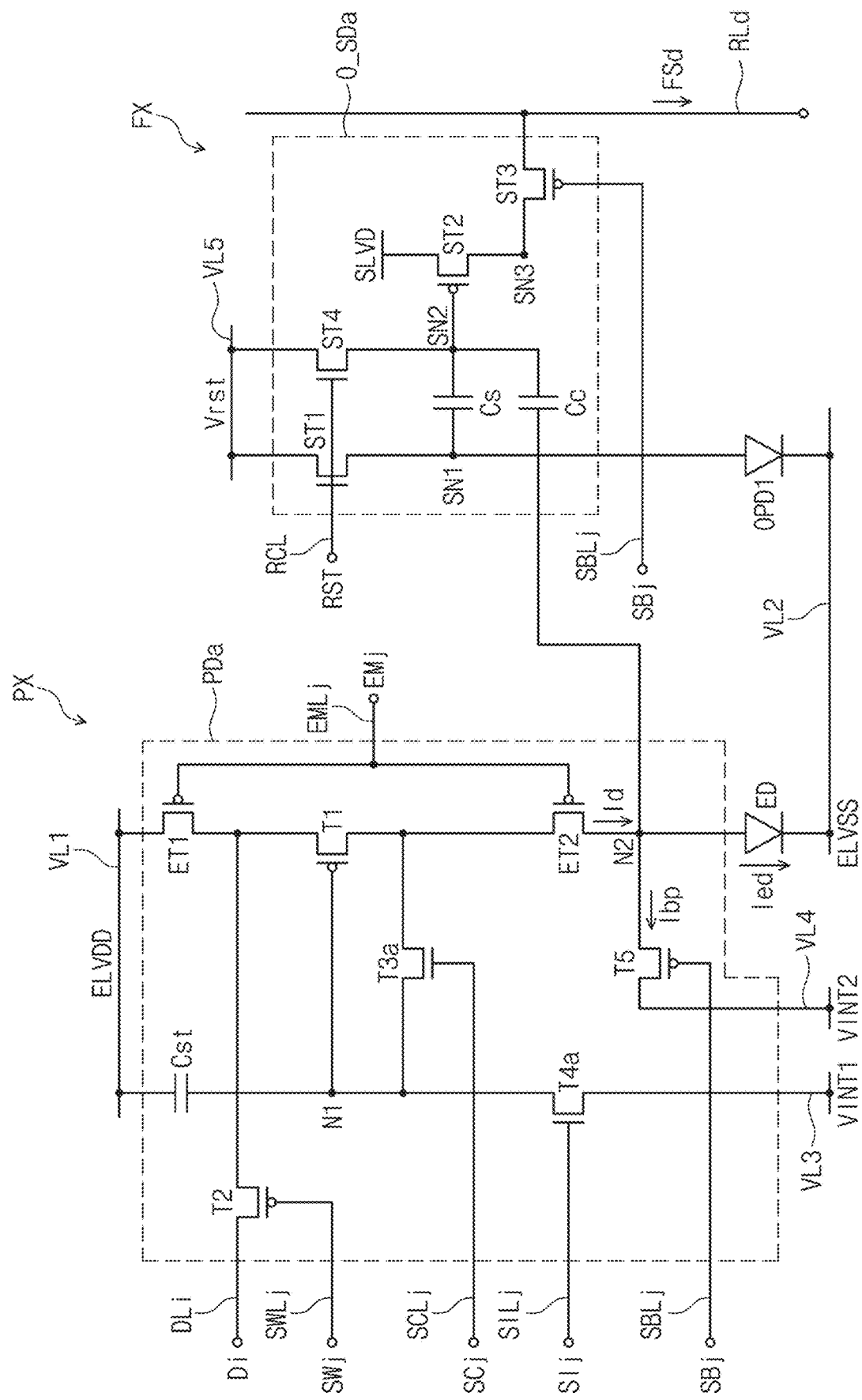
FIG. 12 is a circuit diagram of a pixel and a sensor, according to some embodiments of the present disclosure.

FIG. 12 is a circuit diagram of a pixel and a sensor, according to some embodiments of the present disclosure. The same reference numerals are given to the same components as those shown in FIGS. 9A and 11A among the components shown in FIG. 12, and thus a detailed description thereof will be omitted to avoid redundancy.

Referring to FIG. 12, the pixel PX includes the light emitting element ED and the pixel driving circuit PDa. The pixel driving circuit PDa has the same configuration as the pixel driving circuit PDa shown in FIG. 11A.

The sensor FX includes the light receiving element OPD and a sensor driving circuit O_SDa. The sensor driving circuit O_SDa includes four transistors ST1 to ST4 and two capacitors Cs and Cc. The four transistors ST1 to ST4 may be a first reset transistor ST1, a second reset transistor ST4, an amplification transistor ST2, and an output transistor ST3, respectively. The first reset transistor ST1, the second reset transistor ST4, and the amplification transistor ST2 are the same as the first reset transistor ST1, the second reset transistor ST4, and the amplification transistor ST2, which are illustrated in FIG. 11A, and thus a detailed description thereof will be omitted to avoid redundancy.

The two capacitors Cs and Cc include the sensing capacitor Cs and the down capacitor Cc. The sensing capacitor Cs may be connected between the first sensing node SN1 and the second sensing node SN2. The down capacitor Cc may be coupled between the second node N2 and the second sensing node SN2.

The output transistor ST3 includes a first electrode connected to the third sensing node SN3, a second electrode connected to the d-th readout line RLd, and a third electrode receiving an output control signal. The output transistor ST3 may deliver a readout signal FSd to the d-th readout line RLd in response to the output control signal. The output control signal may be the j-th black scan signal SBj that is supplied through the j-th black scan line SBLj. That is, the output transistor ST3 may receive the j-th black scan signal SBj provided from the j-th black scan line SBLj as the output control signal.

Referring to FIGS. 11B and 12, when the fifth transistor T5 is turned on during the third activation period APc in response to the j-th black scan signal SBj, the potential of the second node N2 may be initialized (or reduced) to the second initialization voltage VINT2. At this time, the potential of the second sensing node SN2 may be reduced by being coupled by the down capacitor Cc. For example, when the down capacitor Cc is connected thereto in the case where the third potential of the second sensing node SN2 has been about −4.1 V in a structure (see FIG. 11A) where the down capacitor Cc is not connected thereto, the third potential of the second sensing node SN2 may decrease to the fifth potential (approximately −6.9 V) during the initialization of the second node N2. When the down capacitor Cc is connected thereto in the case where the fourth potential of the second sensing node SN2 has been about −4.0 V in a structure (see FIG. 11A) where the down capacitor Cc is not connected thereto, the fourth potential of the second sensing node SN2 may decrease to approximately the sixth potential (approximately −6.8 V) during the initialization of the second node N2. That is, the potential of the second sensing node SN2 may be lowered without reducing the voltage level of the reset voltage Vrst.

When the potential of the second sensing node SN2 is lowered to the fifth potential or the sixth potential, a difference between the first sensing current and the second sensing current output from the amplification transistor ST2 may be increased by the current-voltage characteristics of a transistor. That is, even though the difference between the fifth potential and the sixth potential of the second sensing node SN2 is the same as the difference between the third potential and the fourth potential, the difference between the first sensing current and the second sensing current may be much greater than the difference between the first sensing current and the second sensing current. As such, as the difference between the first sensing current and the second sensing current increases, the sensing accuracy (i.e., the ability to distinguish between a valley and a ridge) of the sensor FX may be improved.

Figure 13A:
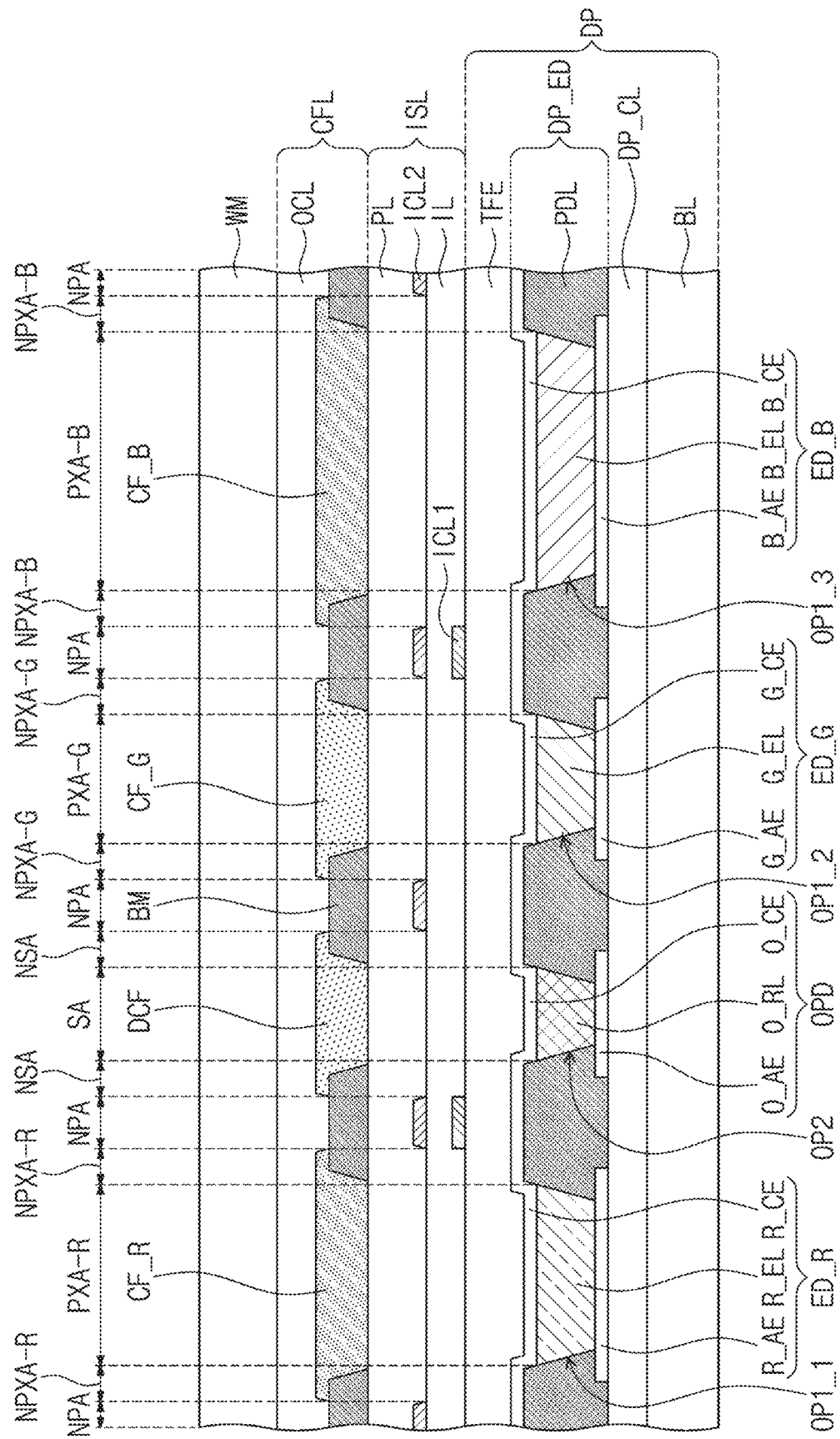
FIGS. 13A and 13B are cross-sectional views illustrating a light emitting element and a light receiving element of a display panel, according to some embodiments of the present disclosure.
Figure 13B:
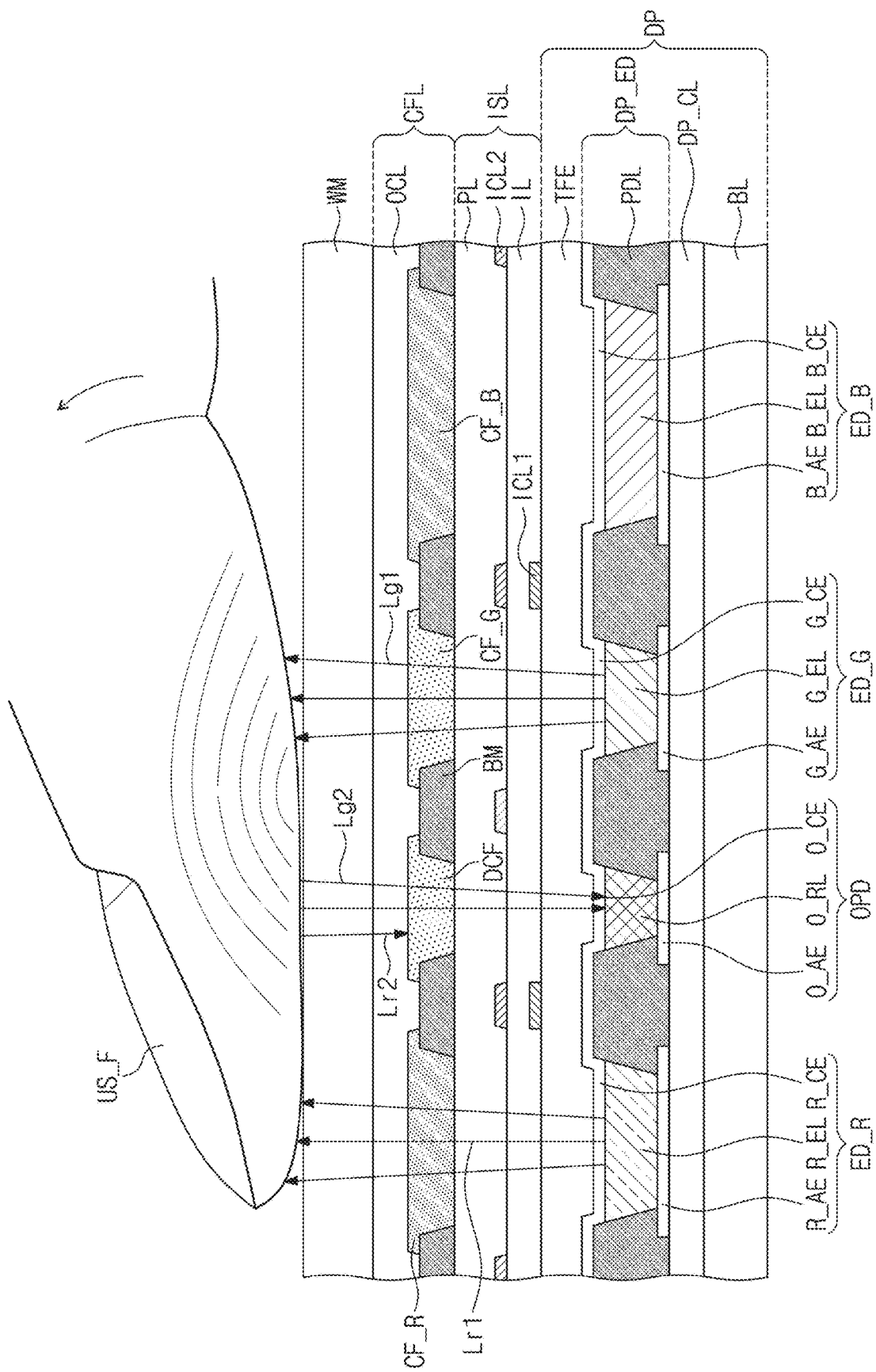

FIGS. 13A and 13B are cross-sectional views illustrating a light emitting element and a light receiving element of a display panel, according to some embodiments of the present disclosure.

Referring to FIGS. 13A and 13B, a first electrode layer is located on the circuit layer DP_CL. The pixel defining layer PDL is formed on the first electrode layer. The first electrode layer may include red, green, and blue anode electrodes R_AE, G_AE, and B_AE. The first to third light emitting openings OP1_1, OP1_2, and OP1_3 of the pixel defining layer PDL expose at least part of the red, green and blue anode electrodes R_AE, G_AE, and B_AE, respectively. According to some embodiments of the present disclosure, the pixel defining layer PDL may further include a black material. The pixel defining layer PDL may further include a black organic dye/pigment such as carbon black or aniline black. The pixel defining layer PDL may be formed by mixing a blue organic material and a black organic material. The pixel defining layer PDL may further include a liquid-repellent organic material.

As illustrated in FIG. 13A, the display panel DP may include first to third emission areas PXA-R, PXA-G, and PXA-B and first to third non-emission areas NPXA-G, NPXA-B, and NPXA-R adjacent to the first to third emission areas PXA-R, PXA-G, and PXA-B. The non-emission areas NPXA-R, NPXA-G, and NPXA-B may surround the corresponding emission areas PXA-R, PXA-G, and PXA-B, respectively. According to some embodiments, the first emission area PXA-R is defined to correspond to a partial area of the red anode electrode R_AE exposed by the first light emitting opening OP1_1. The second emission area PXA-G is defined to correspond to a partial area of the green anode electrode G_AE exposed by the second light emitting opening OP1_2. The third emission area PXA-B is defined to correspond to a partial area of the blue anode electrode B_AE exposed by the third light emitting opening OP1_3. Non-pixel areas NPA may be defined between the first to third non-emission areas NPXA-R, NPXA-G, and NPXA-B.

A light emitting layer may be located on the first electrode layer. The light emitting layer may include red, green, and blue light emitting layers R_EL, G_EL, and B_EL. The red, green, and blue light emitting layers R_EL, G_EL, and B_EL may be arranged in areas corresponding to the first to third light emitting openings OP1_1, OP1_2, and OP1_3, respectively. The red, green, and blue light emitting layers R_EL, G_EL, and B_EL may be separately formed, respectively. Each of the red, green, and blue light emitting layers R_EL, G_EL, and B_EL may include an organic material and/or an inorganic material. The red, green, and blue light emitting layers R_EL, G_EL, and B_EL may generate a colored light (e.g., a set or predetermined color of light). For example, the red light emitting layer R_EL may generate red light; the green light emitting layer G_EL may generate green light; and, the blue light emitting layer B_EL may generate blue light.

According to some embodiments, the patterned red, green and blue light emitting layers R_EL, G_EL, and B_EL are shown. However, one light emitting layer may be located in the first to third emission areas PXA-R, PXA-G, and PXA-B in common. At this time, the light emitting layer may generate white light or blue light. Besides, the light emitting layer may have a multi-layered structure that is referred to as "tandem".

Each of the red, green, and blue light emitting layers R_EL, G_EL, and B_EL may include a low molecular weight organic material or a high molecular weight organic material as a light emitting material. Alternatively, each of the red, green, and blue light emitting layers R_EL, G_EL, and B_EL may include a quantum dot material as a light emitting material. The core of a quantum dot may be selected from a group II-VI compound, a group III-V compound, a group IV-VI compound, a group IV element, a group IV compound, and a combination thereof.

A second electrode layer is located on the red, green and blue light emitting layers R_EL, G_EL, and B_EL. The second electrode layer may include red, green, and blue cathode electrodes R_CE, G_CE, and B_CE. The red, green, and blue cathode electrodes R_CE, G_CE, and B_CE may be electrically connected to one another. According to some embodiments of the present disclosure, the red, green, and blue cathode electrodes R_CE, G_CE, and B_CE may have an integral shape. In this case, the red, green, and blue cathode electrodes R_CE, G_CE, and B_CE may be arranged in common in the first to third emission areas PXA-R, PXA-G, and PXA-B, the first to third non-emission areas NPXA-R, NPXA-G, and NPXA-B, and the non-pixel area NPA.

The element layer DP_ED may further include the light receiving element OPD. The light receiving element OPD may be a photodiode. The pixel defining layer PDL may further include a light receiving opening OP2 that is provided to correspond to the light receiving element OPD.

The light receiving element OPD may include a sensing anode electrode O_AE, a photoelectric conversion layer O_RL, and a sensing cathode electrode O_CE. The sensor anode electrode O_AE may be located on the same layer as the first electrode layer. That is, the sensor anode electrode O_AE may be located n the circuit layer DP_CL and may be simultaneously formed through the same process as the red, green, and blue anode electrodes R_AE, G_AE, and B_AE.

The light receiving opening OP2 of the pixel defining layer PDL exposes at least part of the sensor anode electrode O_AE. The photoelectric conversion layer O_RL is located on the sensor anode electrode O_AE exposed by the light receiving opening OP2. The photoelectric conversion layer O_RL may include an organic photo-sensing material. The sensing cathode electrode O_CE may be located on the photoelectric conversion layer O_RL. The sensing cathode electrode O_CE may be simultaneously formed through the same process as the red, green, and blue cathode electrodes R_CE, G_CE, and B_CE. According to some embodiments of the present disclosure, the sensing cathode electrode O_CE has an integral shape with the red, green, and blue cathode electrodes R_CE, G_CE, and B_CE, thereby forming the common cathode electrode C_CE (see FIG. 5).

The encapsulation layer TFE is located on the element layer DP_ED. The encapsulation layer TFE includes at least one inorganic layer or at least one organic layer. According to some embodiments of the present disclosure, the encapsulation layer TFE may include two inorganic layers and an organic layer interposed therebetween. According to some embodiments of the present disclosure, a thin-film encapsulation layer may include a plurality of inorganic layers and a plurality of organic layers, which are alternately stacked.

The encapsulation inorganic layer protects the red, green and blue light emitting elements ED_R, ED_G, and ED_B and the light receiving element OPD from moisture/oxygen, and the encapsulation organic layer protects the red, green and blue light emitting elements ED_R, ED_G, and ED_B and the light receiving element OPD from foreign substances. The encapsulation inorganic layer may include a silicon nitride layer, a silicon oxynitride layer, a silicon oxide layer, a titanium oxide layer, an aluminum oxide layer, or the like, but is not specifically limited thereto. The encapsulation organic layer may include an acryl-based organic layer, and is not specifically limited thereto.

The display device DD includes the input sensing layer ISL located on the display panel DP and the color filter layer CFL located on the input sensing layer ISL.

The input sensing layer ISL may be directly located on the encapsulation layer TFE. The input sensing layer ISL includes a first conductive layer ICL1, an insulating layer IL, a second conductive layer ICL2, and a protective layer PL. The first conductive layer ICL1 may be located on the encapsulation layer TFE. FIGS. 13A and 13B illustrate a structure in which the first conductive layer ICL1 is directly located on the encapsulation layer TFE, but embodiments according to the present disclosure re not limited thereto. The input sensing layer ISL may further include a base insulating layer interposed between the first conductive layer ICL1 and the encapsulation layer TFE. In this case, the encapsulation layer TFE may be covered by the base insulating layer, and the first conductive layer ICL1 may be located on the base insulating layer. According to some embodiments of the present disclosure, the base insulating layer may include an inorganic insulating material.

The insulating layer IL may cover the first conductive layer ICL1. The second conductive layer ICL2 is located on the insulating layer IL. A structure in which the input sensing layer ISL includes the first and second conductive layers ICL1 and ICL2 is illustrated. However, embodiments according to the present disclosure are not limited thereto. For example, the input sensing layer ISL may include only one of the first and second conductive layers ICL1 and ICL2.

The protective layer PL may be located on the second conductive layer ICL2. The protective layer PL may include an organic insulating material. The protective layer PL may protect the first and second conductive layers ICL1 and ICL2 from moisture/oxygen, and may protect the first and second conductive layers ICL1 and ICL2 from foreign objects.

The color filter layer CFL may be located on the input sensing layer ISL. The color filter layer CFL may be directly located on the protective layer PL. The color filter layer CFL may include a first color filter CF_R, a second color filter CF_G, and a third color filter CF_B. The first color filter CF_R has a first color, the second color filter CF_G has a second color, and the third color filter CF_B has a third color. According to some embodiments of the present disclosure, the first color may be red, the second color may be green, and the third color may be blue.

The color filter layer CFL may further include a dummy color filter DCF. According to some embodiments of the present disclosure, when an area where the photoelectric conversion layer O_RL is located is defined as a sensing area SA and a periphery of the sensing area SA is defined as a non-sensing area NSA, the dummy color filter DCF may be arranged to correspond to the sensing area SA. The dummy color filter DCF may overlap the sensing area SA and the non-sensing area NSA. According to some embodiments of the present disclosure, the dummy color filter DCF may have the same color as one of the first to third color filters CF_R, CF_G, and CF_B. According to some embodiments of the present disclosure, the dummy color filter DCF may have the same green color as the second color filter CF_G.

The color filter layer CFL may further include a black matrix BM. The black matrix BM may be arranged to correspond to the non-pixel area NPA. The black matrix BM may be arranged to overlap the first and second conductive layers ICL1 and ICL2 in the non-pixel area NPA. According to some embodiments of the present disclosure, the black matrix BM may overlap the non-pixel area NPA and the first to third non-emission areas NPXA-R, NPXA-G, and NPXA- B. The black matrix BM may not overlap the first to third emission areas PXA-R, PXR-G, and PXA-B.

The color filter layer CFL may further include an overcoat layer OCL. The overcoat layer OCL may include an organic insulating material. The overcoat layer OCL may be provided with a thickness sufficient to remove a step between the first to third color filters CF_R, CF_G, and CF_B. A material of the overcoat layer OCL may not be particularly limited as long as the material is capable of planarizing an upper surface of the color filter layer CFL with a given thickness and may include, for example, an acrylate-based organic material.

Referring to FIG. 13B, when the display device DD (see FIG. 1) operates, each of the red, green, and blue light emitting elements ED_R, ED_G, and ED_B may output light. The red light emitting elements ED_R output red light in a red wavelength band; the green light emitting elements ED_G output green light in a green wavelength band; and, the blue light emitting elements ED_B output blue light in a blue wavelength band.

According to some embodiments of the present disclosure, the light receiving element OPD may receive light from specific light emitting elements (e.g., the green light emitting elements ED_G) among the red, green, and blue light emitting elements ED_R, ED_G, and ED_B. That is, the light receiving element OPD may receive second reflected light Lg2 reflected by a user's fingerprint after second light Lg1 is output from the green light emitting elements ED_G. The second light Lg1 and the second reflected light Lg2 may be light in a green wavelength band. The dummy color filter DCF is located over the light receiving element OPD. The dummy color filter DCF may have a green color. Accordingly, the second reflected light Lg2 may pass through the dummy color filter DCF and may be incident onto the light receiving element OPD.

Meanwhile, red light and blue light output from the red and blue light emitting elements ED_R and ED_B may also be reflected by the user's hand US_F. For example, when light reflected by the user's hand US_F after red light Lr1 is output from the red light emitting element ED_R is defined as a first reflected light Lr2, the first reflected light Lr2 may be absorbed without passing through the dummy color filter DCF. That is, because the first reflected light Lr2 fails to pass through the dummy color filter DCF, the first reflected light Lr2 may not be incident onto the light receiving element OPD. Likewise, even though blue light is reflected by the user's hand US_F, the blue light may be absorbed by the dummy color filter DCF. Accordingly, only the second reflected light Lg2 may be provided to the light receiving element OPD.

Although aspects of some embodiments of the present disclosure have been described for illustrative purposes, those skilled in the art will appreciate that various modifications, and substitutions are possible, without departing from the scope and spirit of embodiments according to the present disclosure as disclosed in the accompanying claims, and their equivalents. Accordingly, the technical scope of embodiments according to the present disclosure are not limited to the detailed description of this specification, but should be defined by the claims.

According to some embodiments of the present disclosure, a sensor driving circuit may further include a second reset transistor and a sensing capacitor. The sensing capacitor may prevent, reduce, or delay the increase in the potential of a first sensing node of a sensor to the same level as the potential of a second node (i.e., an anode electrode) of a pixel due to the resistance component formed between a light emitting element and a light receiving element by a common layer.

Also, a potential difference of a first sensing node by the ridges and valleys of a fingerprint may be accurately reflected to a second sensing node by the coupling of a sensing capacitor. Accordingly, it may be possible to prevent or reduce instances of the sensing performance of a sensor being deteriorated by a resistance component.

While aspects of some embodiments of the present disclosure have been described with reference to some embodiments thereof, it will be apparent to those of ordinary skill in the art that various changes and modifications may be made thereto without departing from the spirit and scope of the present disclosure as set forth in the following claims, and their equivalents.

What is claimed is:

1. A display device comprising:
   a base layer;
   a circuit layer on the base layer; and
   an element layer on the circuit layer and including a light emitting element and a light receiving element,
   wherein the circuit layer includes a pixel driving circuit connected to the light emitting element and a sensor driving circuit connected to the light receiving element,
   wherein the pixel driving circuit includes a first transistor having a first channel portion including a silicon semiconductor, and
   wherein the sensor driving circuit includes:
   a first reset transistor including a first electrode configured to receive a reset voltage, a second electrode connected to a first sensing node, and a third electrode configured to receive a reset control signal;
   a second reset transistor, separate from the first reset transistor, and including a first electrode configured to receive the reset voltage, a second electrode connected to a second sensing node, and a third electrode configured to receive the reset control signal; and
   a sensing capacitor including a first electrode connected to the first sensing node and a second electrode connected to the second sensing node,
   wherein each of the first and second reset transistors includes a second channel portion including an oxide semiconductor.

2. The display device of claim 1, wherein the first channel portion is a portion of a first semiconductor pattern, and
   the second channel portion is a portion of a second semiconductor pattern disposed on a different layers from a layer on which the first semiconductor pattern is disposed.

3. The display device of claim 2, wherein the light emitting element includes:
   an anode electrode; and
   a cathode electrode, and
   wherein the light receiving element includes:
   a sensing anode electrode connected to the first sensing node; and
   a sensing cathode electrode electrically connected to the cathode electrode.

4. The display device of claim 3, wherein the sensor driving circuit further includes:
   an amplification transistor including a first electrode configured to receive a sensor driving voltage, a second electrode connected to a third sensing node, and a third electrode connected to the second sensing node, wherein the sensing capacitor is connected between the sensing anode electrode and the third electrode of the amplification transistor.

5. The display device of claim 4, wherein the amplification transistor has a same type as the first transistor,
a channel portion of the amplification transistor is a portion of the first semiconductor pattern.

6. The display device of claim 4, wherein each of the first reset transistor and the second reset transistor is an N-type transistor, and
wherein each of the amplification transistor and the first transistor is a P-type transistor.

7. The display device of claim 3, wherein the cathode electrode and the sensing cathode electrode have an integral shape.

8. The display device of claim 1, wherein the pixel driving circuit includes:
a second transistor connected between a data line and a first electrode of the first transistor and configured to receive a first scan signal;
a third transistor connected between a second electrode of the first transistor and a first node and configured to receive a second scan signal;
a fourth transistor connected between the first node and a first initialization line and configured to receive a third scan signal; and
a fifth transistor connected between the light emitting element and a second initialization line and configured to receive a fourth scan signal.

9. The display device of claim 8, wherein the third transistor includes a third oxide semiconductor layer, and the fourth transistor includes a fourth second oxide semiconductor layer.

10. The display device of claim 9, wherein each of the first reset transistor, the second reset transistor, the third transistor and the fourth transistor is an N-type transistor.

11. The display device of claim 8, wherein the sensor driving circuit further includes:
an amplification transistor including a first electrode configured to receive a sensor driving voltage, a second electrode connected to a third sensing node, and a third electrode connected to the second sensing node; and
an output transistor including a first electrode connected to the third sensing node, a second electrode connected to a readout line, and a third electrode configured to receive an output control signal.

12. The display device of claim 11, wherein the output transistor is configured to receive the fourth scan signal as the output control signal.

13. The display device of claim 1, wherein the sensor driving circuit further includes:
a down capacitor connected between the light emitting element and the second sensing node.

14. The display device of claim 1, wherein the element layer includes:
a common cathode electrode in common in the light emitting element and the light receiving element,
wherein the light receiving element includes:
a sensing anode electrode connected to the first sensing node,
wherein the light emitting element includes:
an anode electrode connected to the pixel driving circuit, and wherein the common cathode electrode faces the sensing anode electrode and the anode electrode.

15. A display device comprising:
a base layer;
a circuit layer on the base layer; and
an element layer on the circuit layer and including a light emitting element and a light receiving element,
wherein the circuit layer includes a pixel driving circuit connected to the light emitting element and a sensor driving circuit connected to the light receiving element,
wherein the pixel driving circuit includes a first transistor having a first channel portion including a silicon semiconductor, and
wherein the sensor driving circuit includes:
a first reset transistor including a first electrode configured to receive a first reset voltage, a second electrode connected to a first sensing node, and a third electrode configured to receive a first reset control signal;
a second reset transistor, separate from the first reset transistor, and including a first electrode configured to receive a second reset voltage, a second electrode connected to a second sensing node, and a third electrode configured to receive a second reset control signal; and
a sensing capacitor including a first electrode connected to the first sensing node and a second electrode connected to the second sensing node,
wherein each of the first and second reset transistors includes a second channel portion including an oxide semiconductor.

16. The display device of claim 15, wherein the first channel portion is a portion of a first semiconductor pattern, and
the second channel portion is a portion of a second semiconductor pattern disposed on a different layer from a layer on which the first semiconductor pattern is disposed.

17. The display device of claim 15, wherein the light emitting element includes:
an anode electrode; and
a cathode electrode, and
wherein the light receiving element includes:
a sensing anode electrode connected to the first sensing node; and
a sensing cathode electrode electrically connected to the cathode electrode.

18. The display device of claim 17, wherein the sensor driving circuit further includes:
an amplification transistor including a first electrode configured to receive a sensor driving voltage, a second electrode connected to a third sensing node, and a third electrode connected to the second sensing node,
wherein the sensing capacitor is connected between the sensing anode electrode and the third electrode of the amplification transistor.

19. The display device of claim 15, wherein the second reset voltage has a voltage level lower than the first reset voltage.

20. The display device of claim 15, wherein the first reset control signal is identical to the second reset control signal.

* * * * *